(12) United States Patent
Wu et al.

(10) Patent No.: US 11,177,727 B2
(45) Date of Patent: Nov. 16, 2021

(54) MOTOR

(71) Applicants: GUANGDONG WELLING MOTOR MANUFACTURING CO., LTD., Guangdong (CN); MIDEA WELLING MOTOR TECHNOLOGY (SHANGHAI) CO., LTD., Shanghai (CN)

(72) Inventors: Di Wu, Shanghai (CN); Jintao Chen, Shanghai (CN); Ziqiang Zhu, Shanghai (CN); Yiming Hu, Shanghai (CN); Hongxiao Wang, Shanghai (CN)

(73) Assignees: GUANGDONG WELLING MOTOR MANUFACTURING CO., LTD., Guangdong (CN); MIDEA WELLING MOTOR TECHNOLOGY (SHANGHAI) CO., LTD., Shanghai (CN)

(*) Notice: Subject to any disclaimer, the term of this patent is extended or adjusted under 35 U.S.C. 154(b) by 344 days.

(21) Appl. No.: 16/346,168

(22) PCT Filed: Dec. 12, 2016

(86) PCT No.: PCT/CN2016/109545
§ 371 (c)(1),
(2) Date: Apr. 30, 2019

(87) PCT Pub. No.: WO2018/076482
PCT Pub. Date: May 3, 2018

(65) Prior Publication Data
US 2020/0044523 A1 Feb. 6, 2020

(30) Foreign Application Priority Data

Oct. 31, 2016 (CN) .......................... 201610952007.2
Oct. 31, 2016 (CN) .......................... 201610971208.7

(51) Int. Cl.
H02K 16/02 (2006.01)
H02K 7/08 (2006.01)
H02K 13/00 (2006.01)

(52) U.S. Cl.
CPC ............. *H02K 16/02* (2013.01); *H02K 7/088* (2013.01); *H02K 13/003* (2013.01)

(58) Field of Classification Search
CPC .............................. H02K 16/02; H02K 16/00
See application file for complete search history.

(56) References Cited

U.S. PATENT DOCUMENTS

| 5,675,203 A | 10/1997 | Schulze et al. | |
|---|---|---|---|
| 6,297,575 B1* | 10/2001 | Yang | H02K 51/00 290/6 |

(Continued)

FOREIGN PATENT DOCUMENTS

| CN | 1077317 A | 10/1993 |
|---|---|---|
| CN | 201323515 Y | 10/2009 |

(Continued)

OTHER PUBLICATIONS

International Search Report dated Aug. 10, 2017 issued in PCT/CN2016/109545.

(Continued)

*Primary Examiner* — Dang D Le
(74) *Attorney, Agent, or Firm* — Scully Scott Murphy & Presser

(57) ABSTRACT

An electric motor (100) includes an excitation stator (10), a salient-pole rotor (20) and an excitation rotor (30), any two of the excitation stator (10), the salient-pole rotor (20) and the excitation rotor (30) being rotatable relative to each other; and a switching actuator (50) configured to select at least one of the salient-pole rotor (20) and the excitation rotor (30) to serve as a rotor rotatable relative to the (Continued)

excitation stator (10) by selectively fixing relative positions of two of the excitation stator (10), the salient-pole rotor (20) and the excitation rotor (30).

16 Claims, 18 Drawing Sheets

(56) References Cited

U.S. PATENT DOCUMENTS

| | | | |
|---|---|---|---|
| 6,848,165 B1 | 2/2005 | Furuse | |
| 7,453,181 B2* | 11/2008 | Kikuchi | F04C 29/0085 310/156.45 |
| 8,339,010 B2* | 12/2012 | Atarashi | H02K 21/029 310/266 |

FOREIGN PATENT DOCUMENTS

| | | |
|---|---|---|
| CN | 103155385 A | 6/2013 |
| CN | 103219816 A | 7/2013 |
| CN | 103346655 A | 10/2013 |
| CN | 104264420 A | 1/2015 |
| CN | 105429407 A | 3/2016 |
| JP | 2014-054153 A | 3/2014 |
| JP | 2015-198558 A | 11/2015 |

OTHER PUBLICATIONS

Notice of First Review Opinion dated May 30, 2018 received in Chinese Patent Application No. CN 201610952007.2 together with an English language translation.
Notice of First Review Opinion dated Jun. 1, 2018 received in Chinese Patent Application No. CN 201610971208.7 together with an English language translation.

\* cited by examiner

MOTOR

CROSS-REFERENCE TO RELATED APPLICATIONS

This is a national stage of International Application No. PCT/CN2016/109545, filed Dec. 12, 2016, claiming priority based on Chinese Patent Application Nos. 201610952007.2 and 201610971208.7, both filed Oct. 31, 2016, the entire contents of which are incorporated herein by reference. No new matter is added.

FIELD

The present disclosure relates to a technical field of motors, more particularly to an electric motor.

BACKGROUND

With the development of science and technology, a speed-adjusting function of an electric motor gradually gains more attention. Usually, the electric motor needs special control or structural design in order to change operational rotation speed in a wide range in consideration of torque characteristics, due to limitation of a bus voltage of a power grid or a drive system. The electric motor in the related art employs field weakening control to achieve the above purpose. However, this method has certain limitations on parameters of the electric motor, and cannot achieve high efficiency operation in both a low-speed high-torque operational region and a high-speed low-torque operational region.

SUMMARY

The present disclosure seeks to solve at least one of the problems existing in the related art to at least some extent.

To this end, the present disclosure proposes an electric motor, which fully incorporates the characteristic of the variable-pole electric motor that the high-efficiency operation region has a wide adjustment range, such that it has characteristics of high torque and high power density, and is suitable for applications requiring high-torque direct drive, such as household appliances, electric vehicles, wind power generation, etc.

The electric motor according to embodiments of present disclosure includes an excitation stator, a salient-pole rotor and an excitation rotor, any two of the excitation stator, the salient-pole rotor and the excitation rotor being rotatable relative to each other; and a switching actuator configured to select at least one of the salient-pole rotor and the excitation rotor to serve as a rotor rotatable relative to the excitation stator by selectively fixing relative positions of two of the excitation stator, the salient-pole rotor and the excitation rotor.

In the electric motor according to embodiments of the present disclosure, when the electric motor operates in low-speed high-torque region, an operational state with a great number of equivalent pole pairs is employed, and an output torque is large; when the electric motor operates in high-speed operational region, an operational state with a small number of equivalent pole pairs is employed, requirements for the high-speed operation are naturally met without field weakening control, and the efficiency is greatly improved due to reduced operational frequency. The equivalent rotor pole-pair numbers and the operational electric frequencies of the electric motor in the three operational states are significantly different, the variable-pole variable-pressure operation is realized without changing winding connection of the electric motor, and the operational rotation speed range is broadened, thereby effectively improving torque density and high power density of the electric motor, and expanding application range of the electric motor. By configuring any two of the excitation stator, the salient-pole rotor and the excitation rotor to be rotatable relative to each other, and by selectively fixing any two of them by means of the switching actuator, at least one of the salient-pole rotor and the excitation rotor can form the rotor rotatable relative to the excitation stator, such that without changing the winding connection of the electric motor, the control over and adjustment to the rotor pole number and the operational frequency of the electric motor can be realized, and the switch of optimal efficiency region of the electric motor between a low-speed high-torque region and a high-speed low-torque region is realized, thereby effectively improving the torque density and the high power density of the electric motor and expanding the application range of the electric motor. The electric motor has a compact structure, little space occupation, and a wide application range, and can realize the controlled adjustment to the rotor pole number and the operational frequency without changing the winding connection of the electric motor, and can output more torque and power compared to the electric motor in the related art having the same overall volume, thus having advantages of high torque and high power density.

Additionally, the electric motor according to embodiments of the present disclosure may further have the following additional technical features.

According to an embodiment of the present disclosure, the excitation stator, the salient-pole rotor and the excitation rotor are spaced apart sequentially from the outside to the inside in a radial direction of the electric motor.

According to an embodiment of the present disclosure, the excitation stator, the salient-pole rotor and the excitation rotor are spaced apart sequentially from the inside to the outside in the radial direction of the electric motor.

According to an embodiment of the present disclosure, the switching actuator is switchable between a first state and a second state, and one of the salient-pole rotor and the excitation rotor is adapted to be drivingly connected to a load. The switching actuator fixes relative positions of the excitation stator and the other one of the salient-pole rotor and the excitation rotor when in the first state; the switching actuator fixes the salient-pole rotor and the excitation rotor when in the second state.

According to an embodiment of the present disclosure, the switching actuator includes: an excitation stator fixing ring, relative positions of the excitation stator fixing ring and the excitation stator being fixed; a salient-pole rotor fixing ring, relative positions of the salient-pole rotor fixing ring and the salient-pole rotor being fixed; an excitation rotor fixing ring, relative positions of the excitation rotor fixing ring and the excitation rotor being fixed, one of the salient-pole rotor fixing ring and the excitation rotor fixing ring being adapted to be drivingly connected to the load; a driving part; and a sliding ring capable of being driven to slide by the driving part, when the switching actuator is in the first state, the sliding ring is fitted with the excitation stator fixing ring and the other one of the salient-pole rotor fixing ring and the excitation rotor fixing ring separately under the drive of the driving part, when the switching actuator is in the second state, the sliding ring is fitted with the salient-pole rotor fixing ring and the excitation rotor fixing ring separately under the drive of the driving part.

According to an embodiment of the present disclosure, the driving part is a control coil configured to drive the sliding ring to slide by electromagnetic induction.

According to an embodiment of the present disclosure, the sliding ring, the excitation stator fixing ring, the salient-pole rotor fixing ring and the excitation rotor fixing ring are each provided with a latch, when the switching actuator is in the first state, the latch of the sliding ring is engaged with the latch of the excitation stator fixing ring and the latch of the other one of the salient-pole rotor fixing ring and the excitation rotor fixing ring separately, when the switching actuator is in the second state, the latch of the sliding ring is engaged with the latch of the salient-pole rotor fixing ring and the latch of the excitation rotor fixing ring separately.

According to an embodiment of the present disclosure, the electric motor further includes an electric motor shaft adapted to be drivingly connected to the load, and the electric motor shaft is driven to rotate by the rotor.

According to an embodiment of the present disclosure, the electric motor further includes a stator housing, the excitation stator, the salient-pole rotor and the excitation rotor being all disposed in the stator housing, and the excitation stator being drivingly connected to the stator housing; and an end cap, the salient-pole rotor and the electric motor shaft being drivingly connected to the end cap separately, in which the excitation stator fixing ring is drivingly connected to the stator housing, the salient-pole rotor fixing ring is drivingly connected to the electric motor shaft, and the excitation rotor fixing ring is drivingly connected to the excitation rotor.

According to an embodiment of the present disclosure, the switching actuator is disposed in the excitation rotor.

According to an embodiment of the present disclosure, the stator housing and the electric motor shaft, the end cap and the excitation rotor, as well as the excitation rotor and the stator housing are fitted by a bearing therebetween respectively.

According to an embodiment of the present disclosure, the electric motor further includes a stator housing, the excitation stator, the salient-pole rotor and the excitation rotor being all disposed in the stator housing, and the excitation stator being drivingly connected to the stator housing; and an end cap, the salient-pole rotor being drivingly connected to the end cap, and the electric motor shaft being drivingly connected to the excitation rotor, in which the excitation stator fixing ring is drivingly connected to the stator housing, the salient-pole rotor fixing ring is drivingly connected to the salient-pole rotor, and the excitation rotor fixing ring is drivingly connected to the electric motor shaft.

According to an embodiment of the present disclosure, the switching actuator is disposed outside the excitation rotor and adjacent to an end of the excitation rotor.

According to an embodiment of the present disclosure, the stator housing and the electric motor shaft, as well as the end cap and the electric motor shaft are fitted by a bearing therebetween respectively.

According to an embodiment of the present disclosure, the switching actuator is disposed outside the excitation stator and adjacent to an end of the excitation stator.

According to an embodiment of the present disclosure, the electric motor further includes: an outer rotor housing, the excitation stator, the salient-pole rotor and the excitation rotor being all disposed in the outer rotor housing, and the excitation rotor being drivingly connected to the outer rotor housing; an inner rotor housing, the salient-pole rotor being drivingly connected to the inner rotor housing and the inner rotor housing being drivingly connected with the electric motor shaft adapted to be drivingly connected to the load; and the stator housing, the excitation stator being drivingly connected to the stator housing, in which the excitation stator fixing ring is drivingly connected to the stator housing, the salient-pole rotor fixing ring is drivingly connected to salient-pole rotor, and the excitation rotor fixing ring is drivingly connected to outer rotor housing.

According to an embodiment of the present disclosure, the outer rotor housing and the electric motor shaft, as well as the stator housing and the electric motor shaft are fitted by a bearing therebetween respectively.

According to an embodiment of the present disclosure, the electronic motor further includes: the outer rotor housing, the excitation stator, the salient-pole rotor and the excitation rotor being all disposed in the stator housing, and the excitation rotor being drivingly connected to the outer rotor housing; and the inner rotor housing, the excitation stator being drivingly connected with a fixed support shaft, and the salient-pole rotor and the fixed support shaft being drivingly connected to the inner rotor housing separately, in which the excitation stator fixing ring is drivingly connected to the fixed support shaft, the salient-pole rotor fixing ring is drivingly connected to the inner rotor housing, and the excitation rotor fixing ring is drivingly connected to the outer rotor housing.

According to an embodiment of the present disclosure, the outer rotor housing and the fixed support shaft, as well as the inner rotor housing and the fixed support shaft are fitted by a bearing therebetween respectively.

According to an embodiment of the present disclosure, the fixed support shaft is a hollow shaft with an annular cross section.

According to an embodiment of the present disclosure, the excitation stator includes a stator permeable core; and a stator winding wound around the stator permeable core.

According to an embodiment of the present disclosure, the excitation rotor includes a rotor permeable core; and a permanent magnet disposed to the rotor permeable core.

According to an embodiment of the present disclosure, the salient-pole rotor includes a plurality of permeable cores, and a plurality of non-permeable spacer blocks, the plurality of permeable cores and the plurality of non-permeable spacer blocks being arranged alternately in a circumferential direction of the electric motor.

According to an embodiment of the present disclosure, the excitation stator is driven by an alternate current, and the number of pole pairs of a rotating magnetic field generated by the excitation stator is denoted by $p_s$, the number of pole pairs of an excitation magnetic field generated by the excitation rotor is denoted by $p_f$, and the number of the permeable cores is denoted by $p_r$, in which $p_r=|p_s \pm p_f|$.

REFERENCE NUMERALS

Figure 1:
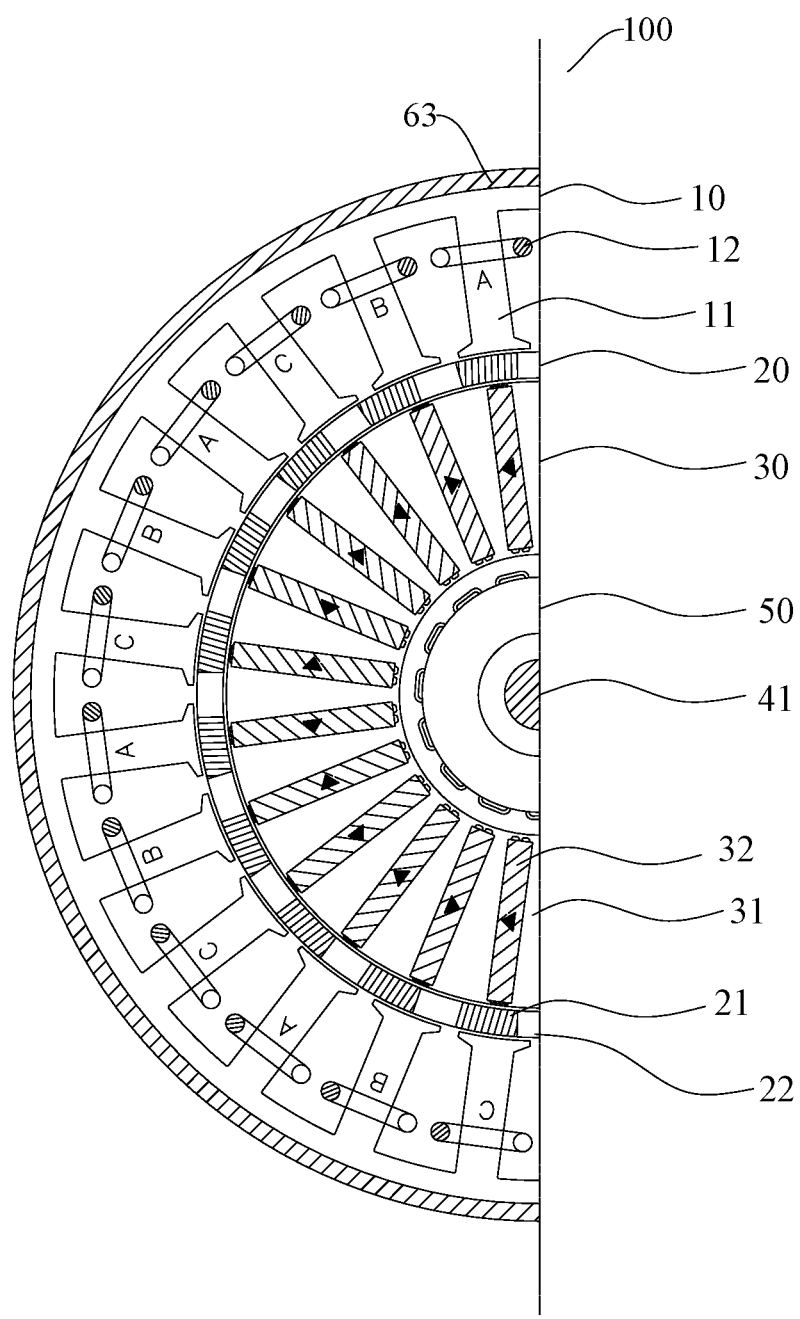
FIG. 1 is a partial schematic view of an electric motor according to an embodiment of the present disclosure.

100: electric motor;

10: excitation stator; 11: stator permeable core; 12: stator winding;

20: salient-pole rotor; 21: permeable core; 22: non-permeable spacer block;

30: excitation rotor; 31: rotor permeable core; 32: permanent magnet;

41: electric motor shaft; 42: fixed support shaft;

50: switching actuator;

51: excitation stator fixing ring; 52: salient-pole rotor fixing ring; 53: excitation rotor fixing ring;

541: driving part (control coil); 542: sliding ring;

61: outer rotor housing; 62: inner rotor housing; 63: stator housing; 64: end cap;

70: bearing.

DETAILED DESCRIPTION

In the related art, an electric motor employs field weakening control to achieve the above purpose. However, this method has certain limitations on parameters of the electric motor, and cannot achieve high efficiency operation in both a low-speed high-torque operational region and a high-speed low-torque operation region.

In order for the above problem, in one aspect, a variable-pole induction electric motor in the related art operates at a fixed power grid frequency, and achieves variation of the number of rotor poles induced in a squirrel cage of a rotor by changing a connection method of a stator winding, so as to adjust a rotation speed of the electric motor. However, the above method is limited to the induction electric motor and is not suitable for a synchronous electric motor, and needs to change the connection of the stator winding, which has been outdated under a general trend of direct-current variable-frequency electric motor development.

Furthermore, in another aspect, scholars propose that it is possible to constitute a memory electric motor by using a low-coercivity permanent magnet such as ALNiCo, and perform an on-line adjustment to the degree of magnetization direction of the rotor permanent magnet through the winding, so as to achieve the purpose of changing the poles of the synchronous electric motor. However, the low-coercivity permanent magnet employed in the above method has a low magnetic energy level, which easily causes the problem that the overall power density of this electric motor is much lower than that of a traditional permanent-magnet synchronous electric motor.

Thus, the present disclosure proposes an electric motor, which fully incorporates the characteristic of the variable-pole electric motor that the high-efficiency operation region has a wide adjustment range, and does not change the electric motor winding during variation of the pole number, such that it has characteristics of high torque and high power density, and is suitable for applications requiring high torque and direct drive, such as household appliances, electric vehicles, wind power generation, etc.

Embodiments of the present disclosure will be described in detail and examples of the embodiments will be illustrated in the drawings, where same or similar reference numerals are used to indicate same or similar members or members with same or similar functions. The embodiments described herein with reference to drawings are explanatory, illustrative, and used to generally understand the present disclosure. The embodiments shall not be construed to limit the present disclosure.

An electric motor 100 according to embodiments of the present disclosure will be specifically described with reference to the FIGS. 1 to 20.

The electric motor 100 according to embodiments of the present disclosure includes an excitation stator 10, a salient-pole rotor 20, an excitation rotor 30, and a switching actuator 50. Specifically, any two of the excitation stator 10, salient-pole rotor 20 and the excitation rotor 30 are rotatable relative to each other, and the switching actuator 50 is configured to select at least one of the salient-pole rotor 20 and the excitation rotor 30 to serve as a rotor rotatable relative to the excitation stator 10 by selectively fixing relative positions of two of the excitation stator 10, the salient-pole rotor 20 and the excitation rotor 30.

Figure 2:
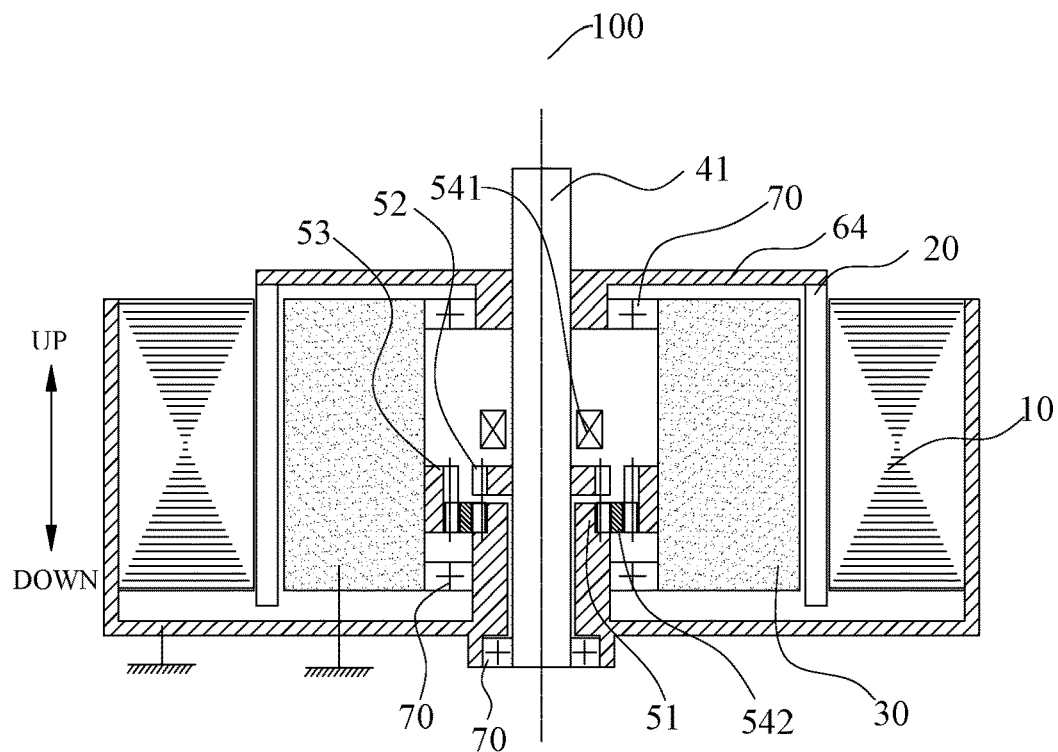
FIG. 2 is a sectional view of a switching actuator of the electric motor shown in FIG. 1, in which the switching actuator is in a first state.

In other words, the electric motor 100 mainly includes the excitation stator 10, the salient-pole rotor 20, the excitation rotor 30, and the switching actuator 50. The excitation stator 10, the salient-pole rotor 20 and the excitation rotor 30 substantially have a cylindrical structure, and are coaxially arranged in an axial direction (an up-and-down direction as illustrated in FIG. 2). Furthermore, any two of the excitation stator 10, the salient-pole rotor 20 and the excitation rotor 30 can rotate relative to each other, that is, the salient-pole rotor 20 can perform rotation relative to the excitation stator 10 or the excitation rotor 30, and at the same time, the excitation rotor 30 also can perform rotation relative to the salient-pole rotor 20 or the excitation stator 10.

Figure 3:
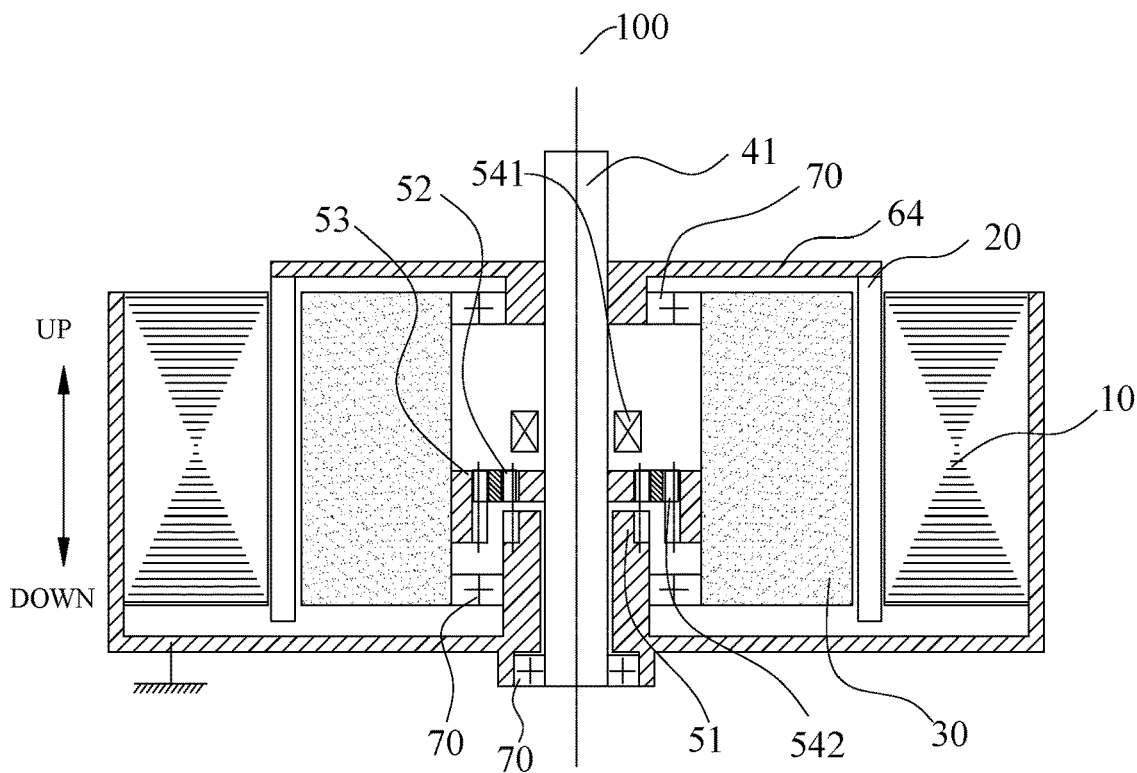
FIG. 3 is a sectional view of a switching actuator of the electric motor shown in FIG. 1, in which the switching actuator is in a second state.
Figure 6:
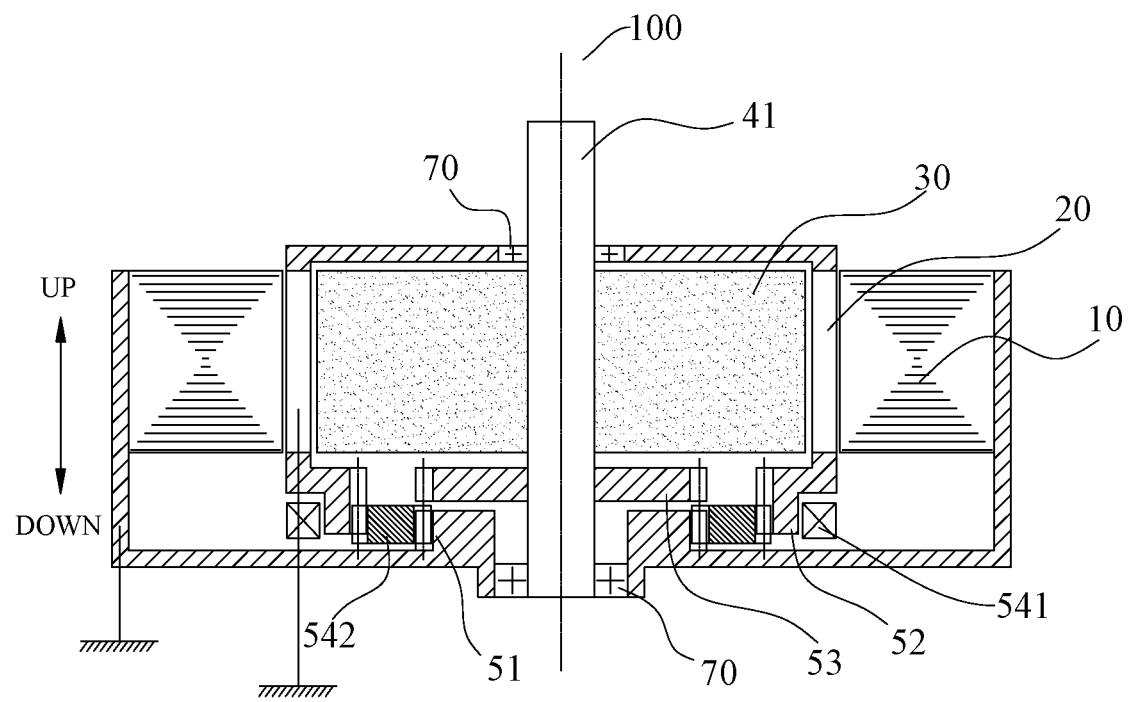
FIG. 6 is a sectional view of a switching actuator of the electric motor shown in FIG. 5, in which the switching actuator is in a first state.
Figure 7:
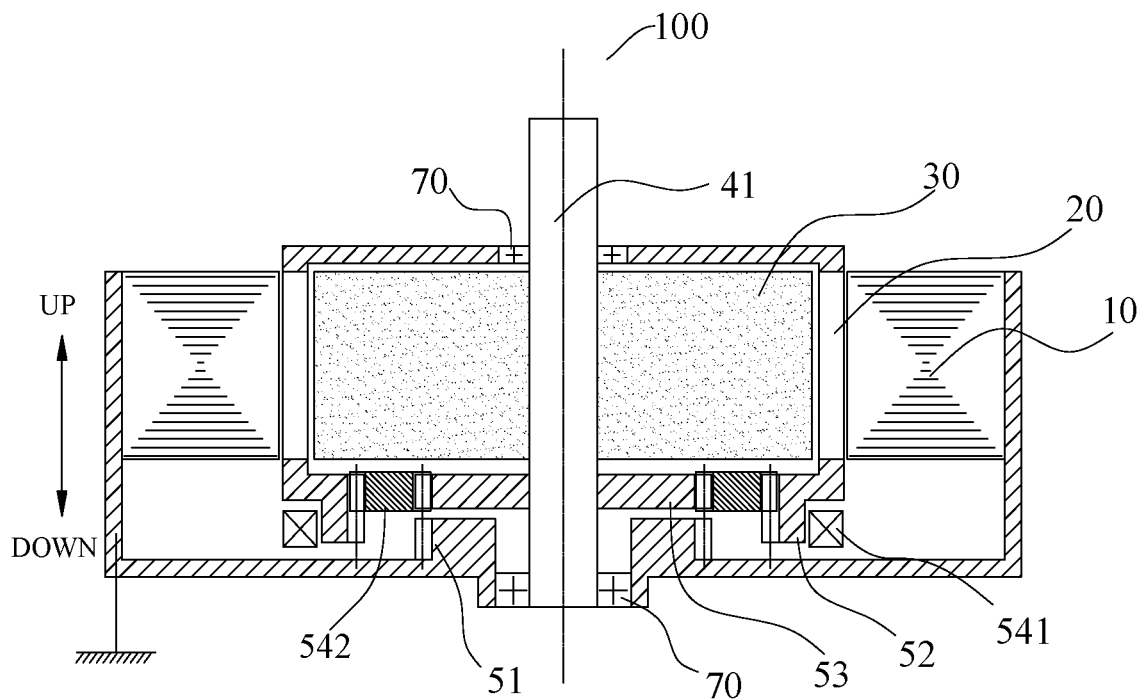
FIG. 7 is a sectional view of a switching actuator of the electric motor shown in FIG. 5, in which the switching actuator is in a second state.

Further, the switching actuator 50 can fix the relative positions of the excitation stator 10 and the excitation rotor 30 (as illustrated in FIG. 2), the relative positions of the excitation rotor 30 and the salient-pole rotor 20 (as illustrated in FIGS. 3 and 7), or the relative positions of the excitation stator 10 and the salient-pole rotor 20 (as illustrated in FIG. 6), such that the salient-pole rotor 20, or the salient-pole rotor 20 and the excitation rotor 30, or the excitation rotor 30 can rotate relative to the excitation stator 10 respectively, forming the rotor rotatable relative to the excitation stator 10. The rotor of the electric motor 100 in the three states transfers power to a load, so as to achieve variable-pole variable-pressure operation of the electric motor 100 without changing the winding connection of the electric motor 100, that is, control over and adjustment to the rotor pole number and operational frequency of the electric motor 100 can be achieved.

Thus, when the electric motor 100 operates in a low-speed high-torque region, an operational state with a great number of equivalent pole pairs is employed, and the output torque is large; when the electric motor 100 operates in a high-speed operational region, an operational state with a small number of equivalent pole pairs is employed, such that requirements for the high speed operation are naturally met without the field weakening control, and the efficiency is greatly improved due to reduced operational frequency, thereby effectively improving torque density and high power density of the electric motor 100, and expanding the application range of the electric motor 100.

In the electric motor 100 according to embodiments of the present disclosure, by configuring any two of the excitation stator 10, the salient-pole rotor 20 and the excitation rotor 30 to be rotatable relative to each other, and by selectively fixing any two of them by means of the switching actuator 50, at least one of the salient-pole rotor 20 and the excitation rotor 30 can form the rotor rotatable relative to the excitation stator 10, such that without changing the winding connection of the electric motor 100, the control over and adjustment to the rotor pole number and the operational frequency of the electric motor 100 can be realized, and the optimal efficiency region of the electric motor 100 can be switched between a low-speed high-torque region and a high-speed low-torque region is realized, thereby effectively improving the torque density and the high power density of the electric motor 100 and expanding the application range of the electric motor 100. The electric motor 100 has a compact structure, little space occupation, and a wide application range, and can realize the controlled adjustment to the rotor pole number and the operational frequency without changing the winding connection of the electric motor 100, thus having advantages of high torque and high power density.

Optionally, the excitation stator 10, the salient-pole rotor 20 and the excitation rotor 30 are sequentially spaced apart from the outside to the inside in a radial direction of the electric motor 100.

Specifically, as illustrated in FIGS. 1 and 2, the excitation stator 10, the salient-pole rotor 20 and the excitation rotor 30 substantially have a cross section in a circular ring shape, and the excitation stator 10, the salient-pole rotor 20 and the excitation rotor 30 are sequentially spaced apart from the outside to the inside in the radial direction of the electric motor 100.

That is to say, the excitation stator 10, the salient-pole rotor 20 and the excitation rotor 30 form a structure with three layers of circular rings arranged coaxially, and the salient-pole rotor 20 is located inside the excitation stator 10 and located outside the excitation rotor 30, and these three are spaced apart to avoid interference when any two of them are rotated relatively, which otherwise will affect normal operation of the electric motor 100.

The switching actuator 50 can fix the relative positions of the excitation stator 10 and the excitation rotor 30 (as illustrated in FIG. 2), such that the salient-pole rotor 20 rotates relative to the excitation stator 10 and the excitation rotor 30, forming the rotor rotatable relative to the excitation stator 10; the switching actuator 50 also can fix the relative positions of the excitation rotor 30 and the salient-pole rotor 20 (as illustrated in FIGS. 3 and 7), such that the salient-pole rotor 20 and the excitation rotor 30 rotate relative to the excitation stator 10, forming the rotor rotatable relative to the excitation stator 10; or the switching actuator 50 can fix the relative positions of the excitation stator 10 and the salient-pole rotor 20 (as illustrated in FIG. 6), such that excitation rotor 30 can rotate relative to the excitation stator 10 and the salient-pole rotor 20 separately, forming the rotor rotatable relative to the excitation stator 10. Any rotor of the electric motor 100 in the three states can output torque to the load, thereby achieving the switch among the three operation states of the electric motor 100.

In some embodiments of the present disclosure, the switching actuator 50 is switchable between a first state and a second state, and one of the salient-pole rotor 20 and the excitation rotor 30 is adapted to be drivingly connected to the load. The switching actuator 50 fixes the relative positions of the excitation stator 10 and the other one of the salient-pole rotor 20 and the excitation rotor 30 when in the first state. The switching actuator 50 fixes the relative positions of the salient-pole rotor 20 and the excitation rotor 30 when in the second state.

Specifically, as illustrated in FIGS. 2 and 3, in the present embodiment, the load is drivingly connected to the salient-pole rotor 20, that is, the load and the salient-pole rotor 20 can be movable synchronously or immovable synchronously, while the switching actuator 50 can fix the relative positions of the excitation stator 10 and the excitation rotor 30, and also can fix the relative positions of the load and the excitation rotor 30, i.e. the relative positions of the load, the salient-pole rotor 20 and the excitation rotor 30 are fixed.

When the switching actuator 50 is in the first state (a position as illustrated in FIG. 2), the switching actuator 50 fixedly connects the relative positions of the excitation stator 10 and the excitation rotor 30, such that the excitation stator 10 and the excitation rotor 30 are immovable synchronously, and the salient-pole rotor 20 forms the rotor rotatable relative to the excitation stator 10. When the switching actuator 50 is in the second state (a position as illustrated in FIG. 3), the switching actuator 50 fixedly connects the relative positions of the salient-pole rotor 20 and the excitation rotor 30, such that the salient-pole rotor 20 and the excitation rotor 30 can be movable or immovable synchronously with the load, realizing a purpose of transmitting power and movement to the load, and the salient-pole rotor 20 and the excitation rotor 30 form the rotor rotatable relative to the excitation stator 10. In such a way, the switch between the first state and the second state of the electric motor 100 is realized, and the adjustment to the equivalent pole-pair number of the rotor and the operation point frequency is realized, thereby achieving the variable-pole variable-pressure operation of the electric motor 100.

Certainly, the present disclosure is not limited to this. In other examples of the present embodiment, the load is drivingly connected to the excitation rotor 30, that is, the load and the excitation rotor 30 can be movable synchronously or immovable synchronously, while the switching actuator 50 can fix the relative positions of the excitation stator 10 and the salient-pole rotor 20, and also can fix the relative positions of the load and the salient-pole rotor 20, i.e. the relative positions of the load, the salient-pole rotor 20 and the excitation rotor 30 are fixed.

As illustrated in FIGS. 6 and 7, the load is drivingly connected to the excitation rotor 30, that is, the load and the excitation rotor 30 can be movable synchronously or immovable synchronously. When the switching actuator 50 is in the first state (a position as illustrated in FIG. 6), the switching actuator 50 fixedly connects the relative positions of the excitation stator 10 and the salient-pole rotor 20, such that the excitation stator 10 and the salient-pole rotor 20 are immovable synchronously, and the excitation rotor 30 forms the rotor rotatable relative to the excitation stator 10. When the switching actuator 50 is in the second state (a position as illustrated in FIG. 7), the switching actuator 50 fixedly connects the relative positions of the salient-pole rotor 20 and the excitation rotor 30, such that the salient-pole rotor 20 and the excitation rotor 30 can be movable or immovable synchronously with the load, and the salient-pole rotor 20 and the excitation rotor 30 form the rotor rotatable relative to the excitation stator 10. In such a way, the switch between the first state and the second state of the electric motor 100 is realized through the switching actuator 50, and the adjustment to the equivalent pole-pair number of the rotor and the operation point frequency is realized, thereby achieving the variable-pole variable-pressure operation of the electric motor 100.

The switching actuator 50 includes an excitation stator fixing ring 51, a salient-pole rotor fixing ring 52, an excitation rotor fixing ring 53, a driving part 541 and a sliding ring 542. The relative positions of the excitation stator fixing ring 51 and the excitation stator 10 are fixed, the relative positions of the salient-pole rotor fixing ring 52 and the salient-pole rotor 20 are fixed, and the relative positions of the excitation rotor fixing ring 53 and the excitation rotor 30 are fixed. One of the salient-pole rotor fixing ring 52 and the excitation rotor fixing ring 53 is adapted to be drivingly connected to the load, and the sliding ring 542 is driven to slide by the driving part 541. When the switching actuator 50 is in the first state, the sliding ring 542 is fitted with the excitation stator fixing ring 51 and the other one of the salient-pole rotor fixing ring 52 and the excitation rotor fixing ring 53 separately under the drive of the driving part 541. When the switching actuator 50 is in the second state, the sliding ring 542 is fitted with the salient-pole rotor fixing ring 52 and the excitation rotor fixing ring 53 separately under the drive of the driving part 541.

Referring to FIGS. 2, 3, 6 and 7, the switching actuator 50 mainly includes the excitation stator fixing ring 51, the salient-pole rotor fixing ring 52, the excitation stator fixing ring 53, the driving part 541 and the sliding ring 542. The excitation stator fixing ring 51 substantially has a cylindrical structure. A lower end of the excitation stator fixing ring 51 is movably connected to the load, and the relative positions of the excitation stator fixing ring 51 and the excitation stator 10 are fixed, that is, the excitation stator fixing ring 51 and the excitation stator 10 are immovable synchronously. The relative positions of the salient-pole rotor fixing ring 52 and the salient-pole rotor 20 are fixed, and the salient-pole rotor fixing ring 52 and the salient-pole rotor 20 can either be movable synchronously (as illustrated in FIGS. 2, 3 and 6) or be immovable synchronously (as illustrated in FIG. 6). The relative positions of the excitation rotor fixing ring 53 and the excitation rotor 30 are fixed, that is, the excitation rotor fixing ring 53 and the excitation rotor 30 can either be movable synchronously (as illustrated in FIGS. 3, 6 and 7), or be immovable synchronously (as illustrated in FIG. 2).

Further, the load can be drivingly connected to the salient-pole rotor fixing ring 52 (as illustrated in FIGS. 2 and 3, these two are movable synchronously), and can also be drivingly connected to the excitation rotor fixing ring 53 (as illustrated in FIGS. 6 and 7, these two are movable synchronously). The sliding ring 542 is disposed adjacent to the excitation stator fixing ring 51, the salient-pole rotor fixing ring 52, and the excitation rotor fixing ring 53, and can be driven to move in the axial direction (e.g. the up-and-down direction as illustrated in FIG. 2) by the driving part 541, thereby realizing the switch among different states of the electric motor 100, and further realizing the variable-pole variable-pressure operation of the electric motor 100.

Optionally, the salient-pole rotor 20 is drivingly connected to the load. When the switching actuator 50 is in the first state (the position as illustrated in FIG. 2), the sliding ring 542 has a first end fitted with the excitation stator fixing ring 51 and a second end fitted with the excitation rotor fixing ring 53 under the drive of the driving part 541, such that the relative positions of the excitation stator 10 and the excitation rotor 30 are fixed (i e immovable synchronously), in which case the salient-pole rotor 20 forms the rotor rotatable relative to the excitation stator 10. When the switching actuator 50 is in the second state (the position as illustrated in FIG. 3), the sliding ring 542 has the first end fitted with the salient-pole rotor fixing ring 52 and the second end fitted with the excitation rotor fixing ring 53 under the drive of the driving part 541, such that the relative positions of the salient-pole rotor 20 and the excitation rotor 30 are fixed (i.e. movable synchronously), in which case the salient-pole rotor 20 and the excitation rotor 30 form the rotor rotatable relative to the excitation stator 10.

In other examples of the present disclosure, the excitation rotor 30 is drivingly connected to the load. When the switching actuator 50 is in the first state (the position as illustrated in FIG. 6), the sliding ring 542 has the first end fitted with the excitation stator fixing ring 51 and the second end fitted with the salient-pole rotor fixing ring 52 under the drive of the driving part 541, such that the relative positions of the excitation stator 10 and the salient-pole rotor 20 are fixed (i.e. immovable synchronously), in which case the excitation rotor 30 forms the rotor rotatable relative to the excitation stator 10. When the switching actuator 50 is in the second state (the position as illustrated in FIG. 7), the sliding ring 542 has the first end fitted with the salient-pole rotor fixing ring 52 and the second end fitted with the excitation rotor fixing ring 53 under the drive of the driving part 541, such that the relative positions of the salient-pole rotor 20 and the excitation rotor 30 are fixed (i.e. movable synchronously), in which case the salient-pole rotor 20 and the excitation rotor 30 form the rotor rotatable relative to the excitation stator 10.

Thus, the electric motor 100 according to the present disclosure can realize the rapid switch between the first state and the second state through the switching actuator 50, such that without changing the winding connection of the electric motor 100, the control over and adjustment to the rotor pole number and the operational frequency of the electric motor 100 can be achieved, the output torque and power of the electric motor 100 is improved, and the application range of the electric motor 100 is expanded.

The driving part 541 is a control coil configured to drive the sliding ring 542 to slide by electromagnetic induction.

By configuring the driving part 541 as the control coil capable of controlling the sliding of the sliding ring 542 through the electromagnetic induction, wiring inside the electric motor 100 can be simplified, such that the overall structure of the electric motor 100 is simpler.

Preferably, the sliding ring 542, the excitation stator fixing ring 51, the salient-pole rotor fixing ring 52, and the excitation rotor fixing ring 53 are each provided with a latch. When the switching actuator 50 is in the first state, the latch of the sliding ring 542 is engaged with the latch of the excitation stator fixing ring 51 and the latch of the other one of the salient-pole rotor fixing ring 52 and the excitation rotor fixing ring 53 separately. When the switching actuator 50 is in the second state, the latch of the sliding ring 542 is engaged with the latch of the salient-pole rotor fixing ring 52 and the latch of the excitation rotor fixing ring 53 separately.

As illustrated in FIGS. 2 and 3, the sliding ring 542 substantially has a cylindrical structure. An inner wall and an outer wall of the sliding ring 542 having the cylindrical structure are provided with a latch respectively. An outer wall of the salient-pole rotor fixing ring 52 is provided with a latch. An inner wall of the excitation rotor fixing ring 53 is provided with a latch. The latch on the inner wall of the sliding ring 542 can be engaged and fitted with the latches on the outer walls of the salient-pole rotor fixing ring 52 and the excitation stator fixing ring 51, and the latch on the outer wall of the sliding ring 542 can be fitted with the latch on the inner wall of the excitation rotor fixing ring 53, such that the reliability of the connection between the sliding ring 542 and the excitation stator fixing ring 51 as well as the connection between the salient-pole rotor fixing ring 52 and the excitation rotor fixing ring 53 is enhanced by utilizing the fitting between the latches, thereby ensuring the normal operation of the electric motor 100.

Specifically, when the switching actuator 50 is in the first state (the position as illustrated in FIG. 2), the latch on the outer wall of the sliding ring 542 is engaged with the latch on the inner wall of the excitation rotor fixing ring 53, and the latch on the inner wall of the sliding ring 542 is engaged with the latch on the outer wall of the excitation stator fixing ring 51, such that the drive connection between the excitation rotor 10 and the excitation rotor 30 is ensured, and the excitation rotor 10 and the excitation rotor 30 are immovable synchronously. When the switching actuator 50 is in the second state (the position as illustrated in FIG. 3), the latch on the inner wall of the sliding ring 542 is engaged with the latch on the outer wall of the salient-pole rotor fixing ring 52, and the latch on the outer wall of the sliding ring 542 is engaged with the latch on the inner wall of the excitation rotor fixing ring 53, such that the drive connection between the salient-pole rotor 20 and the excitation rotor 30 is ensured, and the salient-pole rotor 20 and the excitation rotor 30 rotate synchronously.

In some other examples of the present disclosure, as illustrated in FIGS. 6 and 7, the latch on the inner wall of the sliding ring 542 can be engaged and fitted with the latches on the outer walls of the excitation rotor fixing ring 53 and the excitation stator fixing ring 51, and the latch on the outer wall of the sliding ring 542 can be fitted with the latch on the inner wall of the salient-pole rotor fixing ring 52, such that the reliability of the connection between the sliding ring 542 and the excitation stator fixing ring 51 as well as the connection between the salient-pole rotor fixing ring 52 and the excitation rotor fixing ring 53 is enhanced by utilizing the fitting between the latches, thereby ensuring the normal operation of the electric motor 100.

Specifically, when the switching actuator 50 is in the first state (the position as illustrated in FIG. 6), the latch on the outer wall of the sliding ring 542 is engaged with the latch on the inner wall of the salient-pole rotor fixing ring 52, and the latch on the inner wall of the sliding ring 542 is engaged with the latch on the outer wall of the excitation stator fixing ring 51, such that the drive connection between the excitation rotor 10 and the salient-pole rotor 20 is ensured, and the excitation rotor 10 and the salient-pole rotor 20 are immovable synchronously. When the switching actuator 50 is in the second state (as illustrated in FIG. 7), the latch on the inner wall of the sliding ring 542 is engaged with the latch on the outer wall of the excitation rotor fixing ring 53, and the latch on the outer wall of the sliding ring 542 is engaged with the latch on the inner wall of the salient-pole rotor fixing ring 52, such that the drive connection between the salient-pole rotor 20 and the excitation rotor 30 is ensured, and the salient-pole rotor 20 and the excitation rotor 30 rotate synchronously.

The electric motor 100 further includes an electric motor shaft 41 adapted to be drivingly connected to the load, and the electric motor shaft 41 is driven to rotate by the rotor.

Specifically, the electric motor 100 mainly includes the excitation stator 10, the salient-pole rotor 20, the excitation rotor 30, the switching actuator 50, and the electric motor shaft 41. The excitation stator 10, the salient-pole rotor 20 and the excitation rotor 30 substantially have a cylindrical structure, and are coaxially arranged in the axial direction (the up-and-down direction as illustrated in FIG. 2). Furthermore, any two of the excitation stator 10, the salient-pole rotor 20 and the excitation rotor 30 can rotate relative to each other, that is, the salient-pole rotor 20 can perform rotation relative to the excitation stator 10 or the excitation rotor 30, and at the same time, the excitation rotor 30 also can perform rotation relative to the salient-pole rotor 20 or the excitation stator 10.

Further, the switching actuator 50 can fix the relative positions of the excitation stator 10 and the excitation rotor 30 (as illustrated in FIG. 2), the relative positions of the excitation rotor 30 and the salient-pole rotor 20 (as illustrated in FIGS. 3 and 7), or the relative positions of the excitation stator 10 and the salient-pole rotor 20 (as illustrated in FIG. 6), such that the salient-pole rotor 20, or the salient-pole rotor 20 and the excitation rotor 30, or the excitation rotor 30 can rotate relative to the excitation stator 10 respectively, forming the rotor rotatable relative to the excitation stator 10 and configured to drive the electric motor shaft 41. The rotor of the electric motor 100 in the three states can drive the electric motor shaft 41 to rotate, so as to achieve the variable-pole variable-pressure operation of the electric motor 100 without changing the winding connection of the electric motor 100, that is, the control over and adjustment to the rotor pole number and the operational frequency of the electric motor 100 can be achieved.

Thus, when the electric motor 100 operates in the low-speed high-torque region, an operational state with a great number of equivalent pole pairs is employed, and the output torque is large; when the electric motor 100 operates in the high-speed operational region, an operational state with a small number of equivalent pole pairs is employed, requirements for the high-speed operation are naturally met without the field weakening control, and the efficiency is greatly improved due to the reduced operational frequency, thereby effectively improving the torque density and the high power density of the electric motor 100, and expanding the application range of the electric motor 100.

In the electric motor 100 according to embodiments of the present disclosure, by configuring any two of the excitation stator 10, the salient-pole rotor 20 and the excitation rotor 30 to be rotatable relative to each other, and by selectively fixing any two of them by means of the switching actuator 50, at least one of the salient-pole rotor 20 and the excitation rotor 30 can form the rotor rotatable relative to the excitation stator 10, such that without changing the winding connection of the electric motor 100, the control over and adjustment to the rotor pole number and the operational frequency of the electric motor 100 can be realized, and the switch of the optimal efficiency region of the electric motor 100 between the low-speed high-torque region and the high-speed low-torque region is realized, thereby effectively improving the torque density and the high power density of the electric motor 100 and expanding the application range of the electric motor 100. The electric motor 100 has the compact structure, the little space occupation, and the wide application range, and can realize the controlled adjustment to the rotor pole number and the operational frequency without changing the winding connection of the electric motor 100, thus having advantages of high torque and high power density.

In some embodiments of the present disclosure, the electric motor 100 further includes a stator housing 63 and an end cap 64. Specifically, the excitation stator 10, the salient-pole rotor 20 and the excitation rotor 30 are all disposed in the stator housing 63. The excitation stator 10 is drivingly connected to the stator housing 63, the salient-pole rotor 20 and the electric motor shaft 41 are drivingly connected to the end cap 64 separately, the excitation stator fixing ring 51 is drivingly connected to the stator housing 63, the salient-pole rotor fixing ring 52 is drivingly connected to the electric motor shaft 41, and the excitation rotor fixing ring 53 is drivingly connected to the excitation rotor 30.

Referring to FIGS. 2 and 3, the stator housing 63 substantially has a cylindrical structure with an open end (e.g. an upper end), and the excitation stator 10, the salient-pole rotor 20 and the excitation stator 10 are coaxially disposed in the stator housing 63 and spaced apart sequentially from the outside to the inside in a radial direction of the stator housing 63, such that elements inside the electric motor 100 are protected by the stator housing 63 from accidental damage. The excitation stator fixing ring 51 is disposed to an upper end of a middle portion of the stator housing 63 and is integrally formed with the stator housing 63. Meanwhile, the drive connection is employed between the excitation stator 10 and the stator housing 63, between the salient-pole rotor 20 and the end cap 64, between the electric motor shaft 41 and the end cap 64, between the excitation stator fixing ring 51 and the stator housing 63, between the salient-pole rotor fixing ring 52 and the electric motor shaft 41, as well as between the excitation rotor fixing ring 53 and the excitation rotor 30. That is to say, the excitation stator 10 and the stator housing 63, the salient-pole rotor 20 and the end cap 64, the electric motor shaft 41 and the end cap 64, the excitation stator fixing ring 51 and the stator housing 63, the salient-pole rotor fixing ring 52 and the electric motor shaft 41, as well as the excitation rotor fixing ring 53 and the excitation rotor 30 are movable synchronously or immovable synchronously, respectively. For example, in the present embodiment, there is no relative movement between the excitation stator 10 and the stator housing 63, the stator housing 63 is in a fixed state, and thus the excitation stator 10 is also in a fixed state.

When the switching actuator 50 is in the first state (the position as illustrated in FIG. 2), the sliding ring 542 has the first end fitted with the excitation stator fixing ring 51 and the second end fitted with the excitation rotor fixing ring 53 under the drive of the driving part 541, such that the relative positions of the excitation stator 10 and the excitation rotor 30 are fixed (i.e. these two are immovable synchronously), in which case the salient-pole rotor 20 forms the rotor rotatable relative to the excitation stator 10. When the switching actuator 50 is in the second state (the position as illustrated in FIG. 3), the sliding ring 542 has the first end fitted with the salient-pole rotor fixing ring 52 and the second end fitted with the excitation rotor fixing ring 53 under the drive of the driving part 541, such that the relative positions of the salient-pole rotor 20 and the excitation rotor 30 are fixed (i.e. these two are movable synchronously), in which case the salient-pole rotor 20 and the excitation rotor 30 form the rotor rotatable relative to the excitation stator 10. The switch of the electric motor 100 between the first state and the second state is realized by the switching actuator 50, such that the adjustment to the equivalent pole-pair number of the rotor and the operational point frequency is realized, and the variable-pole variable-pressure operation of the electric motor 100 is realized.

Further, the switching actuator 50 is disposed in the excitation rotor 30.

Referring to FIGS. 2 and 3, the switching actuator 50 is disposed between the excitation rotor 30 and the electric motor shaft 41, and adjacent to an end (the inner wall) of the excitation rotor 30, such that circuit wiring of the switching actuator 50 can be simplified, and the reliability of the control over the switching actuator 50 can be enhanced. It is worth noting that, the switching actuator 50 may be electromagnetic, and may also be mechanical, which may be selected by those skilled in the art according to actual design requirements.

The stator housing 63 and the electric motor shaft 41, the end cap 64 and the excitation rotor 30, as well as the excitation rotor 30 and the stator housing 63 are fitted by a bearing 70 therebetween, respectively.

Specifically, as illustrated in FIGS. 2 and 3, the stator housing 63 and the electric motor shaft 41, the excitation stator fixing ring 51 of the stator housing 63 and the excitation rotor 30, as well as the end cap 64 and the excitation rotor 30 are fitted by the bearing 70 therebetween respectively, so as to maintain the distance and rotational independence between each other.

In some other embodiments of the present disclosure, the electric motor 100 further includes the stator housing 63 and the end cap 64. The excitation stator 10, the salient-pole rotor 20 and the excitation rotor 30 are all disposed in the stator housing 63. The excitation stator 10 is drivingly connected to the stator housing 63, the salient-pole rotor 20 is drivingly connected to the end cap 64, the electric motor shaft 41 is drivingly connected to the excitation rotor 30, the excitation stator fixing ring 51 is drivingly connected to the stator housing 63, the salient-pole rotor fixing ring 52 is drivingly connected to the salient-pole rotor 20, and the excitation rotor fixing ring 53 is drivingly connected to the electric motor shaft 41.

Specifically, as illustrated in FIGS. 6 and 7, the stator housing 63 substantially has a cylindrical structure with an open end (e.g. an upper end), and the excitation stator 10, the salient-pole rotor 20 and the excitation stator 10 are coaxially disposed in the stator housing 63 and spaced apart sequentially from the outside to the inside in the radial direction of the stator housing 63, such that elements inside the electric motor 100 are protected by the stator housing 63 from accidental damage. The excitation stator fixing ring 51 is disposed to the upper end of the middle portion of the stator housing 63 and is integrally formed with the stator housing 63.

Meanwhile, the drive connection is employed between the excitation stator 10 and the stator housing 63, between the salient-pole rotor 20 and the end cap 64, between the electric motor shaft 41 and the excitation rotor 30, between the excitation stator fixing ring 51 and the stator housing 63, between the salient-pole rotor fixing ring 52 and the salient-pole rotor 20, as well as between the excitation rotor fixing ring 53 and the electric motor shaft 41. That is to say, the excitation stator 10 and the stator housing 63, the salient-pole rotor 20 and the end cap 64, the electric motor shaft 41 and excitation rotor 30, the excitation stator fixing ring 51 and the stator housing 63, the salient-pole rotor fixing ring 52 and the salient-pole rotor 20, as well as the excitation rotor fixing ring 53 and the electric motor shaft 41 are movable synchronously or immovable synchronously, respectively. For example, in the present embodiment, there is no relative movement between the salient-pole rotor fixing ring 52 and the salient-pole rotor 20.

When the switching actuator 50 is in the first state (the position as illustrated in FIG. 6), the sliding ring 542 has the first end fitted with the excitation stator fixing ring 51 and the second end fitted with the salient-pole rotor fixing ring 52 under the drive of the driving part 541, such that the relative positions of the excitation stator 10 and the salient-pole rotor 20 are fixed (i.e. these two are immovable synchronously), in which case the excitation rotor 30 forms the rotor rotatable relative to the excitation stator 10. When the switching actuator 50 is in the second state (the position as illustrated in FIG. 7), the sliding ring 542 has the first end fitted with the salient-pole rotor fixing ring 52 and the second end fitted with the excitation rotor fixing ring 53 under the drive of the driving part 541, such that the relative positions of the salient-pole rotor 20 and the excitation rotor 30 are fixed (i.e. these two are movable synchronously), in which case the salient-pole rotor 20 and the excitation rotor 30 form the rotor rotatable relative to the excitation stator 10. The switch of the electric motor 100 between the first state and the second state is realized by the switching actuator 50, such that the adjustment to the equivalent pole-pair number of the rotor and the operational point frequency is realized, and the variable-pole variable-pressure operation of the electric motor 100 is realized.

Further, the switching actuator 50 is disposed outside the excitation rotor 30 and adjacent to an end of the excitation rotor 30.

Referring to FIGS. 6 and 7, the switching actuator 50 is disposed outside the excitation rotor 30 and adjacent to the end of the excitation rotor 30, such that the circuit wiring of the switching actuator 50 can be simplified, and the reliability of the control of the switching actuator 50 can be enhanced. It is worth noting that, the switching actuator 50 may be electromagnetic, and may also be mechanical, which may be selected by those skilled in the art according to actual design requirements.

The stator housing 63 and the electric motor shaft 41, the end cap 64 and the electric motor shaft 41 are fitted by a bearing 70 therebetween, respectively. Specifically, as illustrated in FIGS. 6 and 7, the stator housing 63 and the electric motor shaft 41, the end cap 64 and the electric motor shaft 41 are fitted by the bearing 70 therebetween respectively, so as to maintain the distance and the rotational independence between each other.

The excitation stator 10 includes a stator permeable core 11 and a stator winding 12, and the stator winding 12 is wound around the stator permeable core 11.

Figure 5:
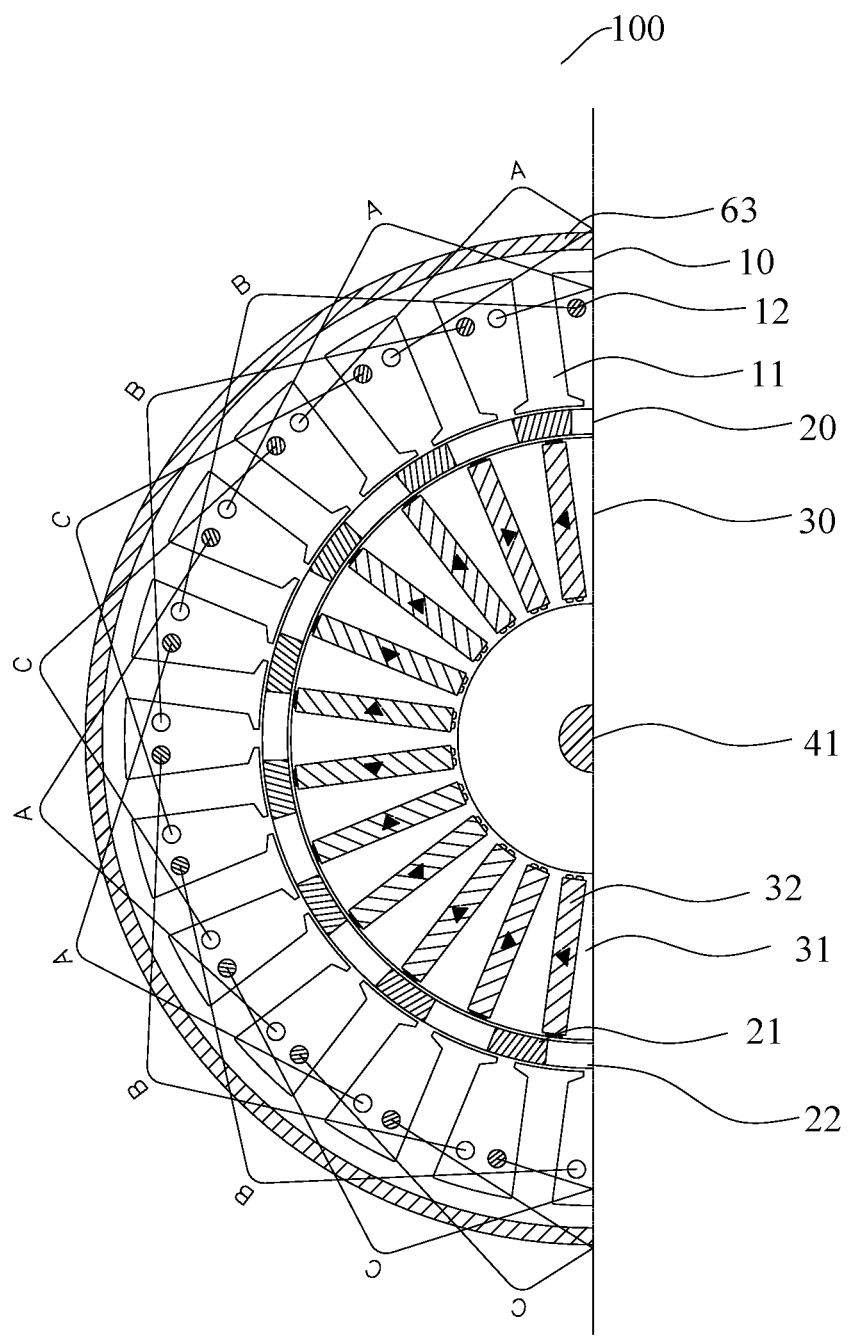
FIG. 5 is a partial schematic view of an electric motor according to another embodiment of the present invention.

Referring to FIGS. 1 and 2, the excitation stator 10 mainly includes the stator permeable core 11 and the stator winding 12, and the stator permeable core 11 is constituted by a high-permeability material. The high-permeability material may be silicon steel sheet, cobalt sheet steel, permalloy, SMC, etc. The stator winding 12 is wound around the stator permeable core 11. The stator winding 12 may be a concentrated winding (as illustrated in FIG. 1), and may also be a distributed winding (as illustrated in FIG. 5). That is to say, a span of the stator winding 12 may be 1 or another integer, and at the same time, the number of phases of the stator winding 12 may be monophase or polyphase, such that an AC current passes through the stator winding 12 to generate a magnetic field. It is worth noting that, the specific material of the stator permeable core 11, the winding form of the stator winding 12, and the number of phases of the stator winding 12 may be adaptively selected according to actual design requirements, so as to ensure the torque and the power density of the electric motor 100.

The excitation rotor 30 includes a rotor permeable core 31 and a permanent magnet 32, and the permanent magnet 32 is disposed to the rotor permeable core 31.

Specifically, as illustrated in FIG. 1, the excitation rotor 30 mainly includes the rotor permeable core 31 and the permanent magnet 32, and the permanent magnets 32 are disposed to the rotor permeable core 31, and evenly arranged in a circumferential direction of the rotor permeable core 31. The rotor permeable core 31 is constituted by a high-permeability material. The high-permeability material may be silicon steel sheet, cobalt sheet steel, permalloy, SMC, etc. The permanent magnet 32 is mainly constituted by a permanent magnetic material, and the permanent magnetic material may be neodymium iron boron, ferrite, alnico, samarium cobalt, etc. The permanent magnet 32 may be joined to the rotor permeable core 31 by ways of surface mounting (SPM), built-in (IPM), surface insetting (Inset PM), or the like. For example, in an example of the present disclosure, the permanent magnet 32 is embedded in the rotor permeable core 31 with the same polarities opposite to each other, thereby ensuring a stable structure of the excitation rotor 30 so as to generate an excitation magnetic field.

Figure 8:
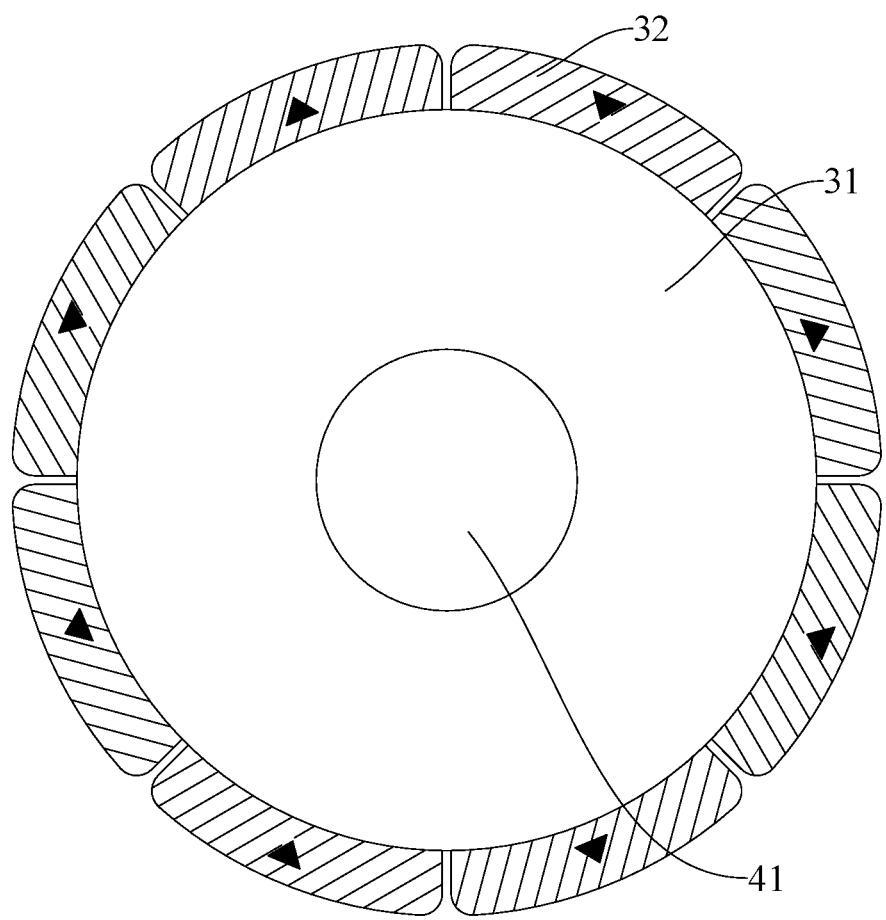
FIG. 8 is a partial schematic view of an electric motor according to an embodiment of the present disclosure, in which an excitation rotor has four pairs of poles.
Figure 9:
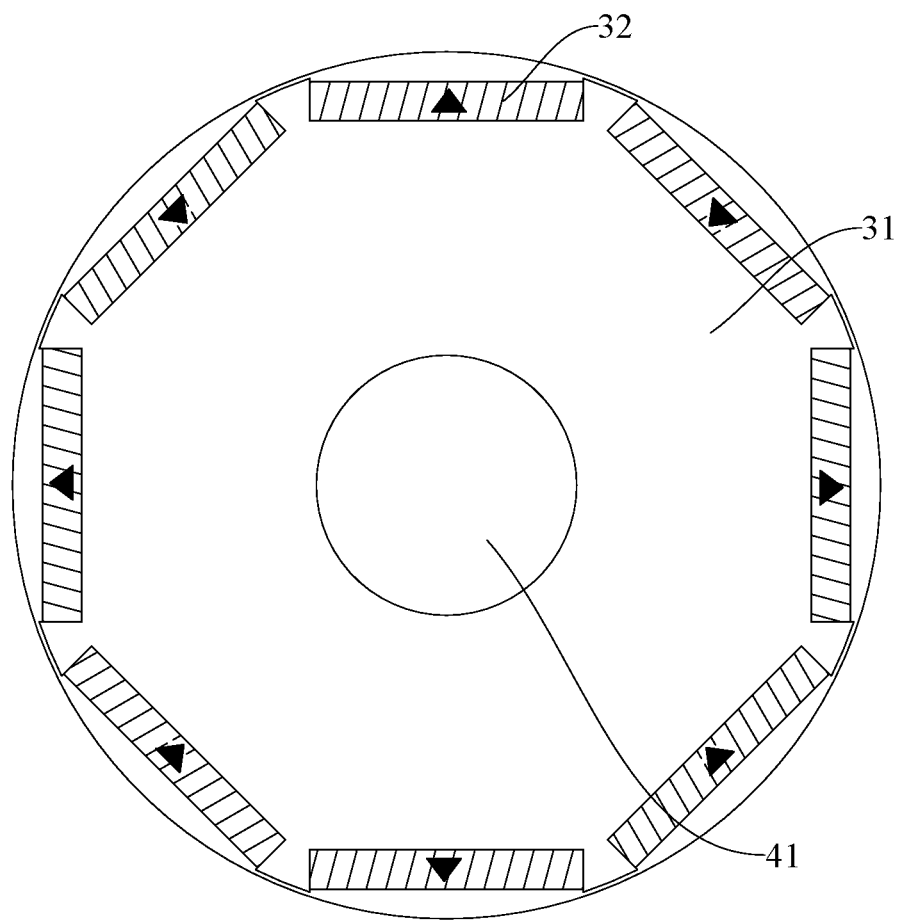
FIG. 9 is a partial schematic view of an electric motor according to another embodiment of the present disclosure, in which an excitation rotor has four pairs of poles.
Figure 10:
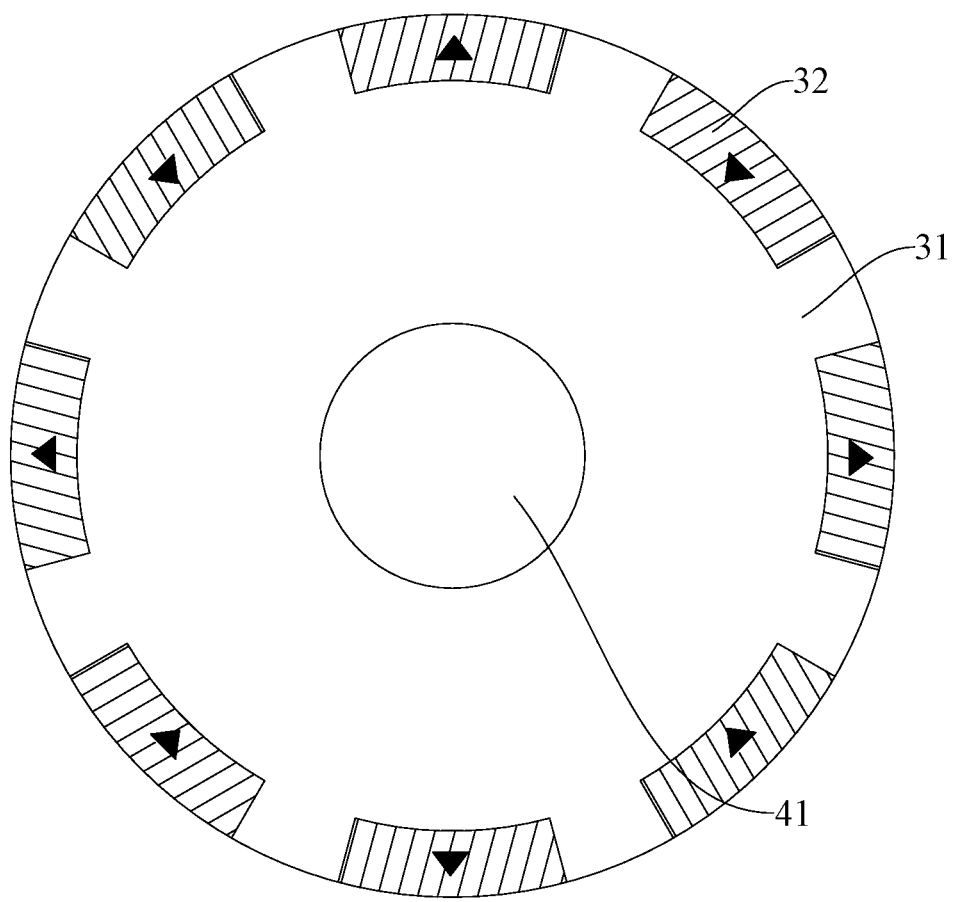
FIG. 10 is a partial schematic view of an electric motor according to still another embodiment of the present disclosure, in which an excitation rotor has four pairs of poles.

Optionally, the permanent magnet 32 substantially has a structure in a long strip shape. twenty-four permanent magnets 32 are provided, a plurality of strip-shaped permanent magnets 32 are embedded in the rotor permeable core 31 and spaced apart in the circumferential direction with the same polarities opposite to each other, and long edges of the strip-shaped permanent magnets 32 are arranged in the radial direction (as illustrated in FIGS. 1 and 5). Certainly, eight permanent magnets 32 may be provided, and long edges of the strip-shaped permanent magnets 32 are arranged in circumferential direction (as illustrated in FIG. 9). Furthermore, the permanent magnet 32 may also have an arc shape. A plurality of permanent magnets 32 having an arc structure are embedded in the rotor permeable core 31 and spaced apart in the circumferential direction with the same polarities opposite to each other, and the arc edge of the arc-shaped permanent magnet 32 is arranged in the circumferential direction (as illustrated in FIGS. 8 and 10). It is worth noting that, the number, shape and arrangement of the permanent magnets 32 can be changed by those skilled in the art according to actual design requirements, to adjust the equivalent pole-pair number of the rotor and the operational frequency, such that the variable-pole variable-pressure operation can be realized by switching different operational states (e.g. the first state and the second state) of the electric motor 100 at the same output mechanical speed.

The salient-pole rotor 20 includes a plurality of permeable cores 21 and a plurality of non-permeable spacer blocks 22, and the plurality of permeable cores 21 and the plurality of non-permeable spacer blocks 22 are alternately arranged in the circumferential direction of the electric motor 100.

Referring to FIG. 1, the salient-pole rotor 20 mainly includes the plurality of permeable cores 21 and the plurality of non-permeable spacer blocks 22, and the plurality of permeable cores 21 and the plurality of non-permeable spacer blocks 22 are alternately arranged in the circumferential direction of the electric motor 100. The permeable core 21 is constituted by a high-permeability material. The high-permeability material may be silicon steel sheet, cobalt sheet steel, permalloy, SMC, etc. The non-permeable spacer block 22 is constituted by a non-permeable material, and the non-permeable material may be air, plastic, a high-molecular polymer, a non-permeable metal, etc.

Preferably, the excitation stator 10 is driven by an alternate current, and the number of pole pairs of a rotating magnetic field generated by the excitation staro 10 is denoted by $p_s$, the number of pole pairs of the excitation magnetic field generated by the excitation rotor 30 is denoted by $p_f$, and the number of the permeable cores 21 is denoted by $p_r$, in which $p_r=|p_s \pm p_f|$.

Specifically, the excitation stator 10 is driven by the alternate current, and generates the rotating magnetic field with the pole-pair number being $p_s$, the excitation rotor 30 generates the excitation magnetic field with the pole-pair number being $p_f$, and the number of the permeable cores 21 is $p_r$. Meanwhile, the number of the permeable cores 21 equals to a sum or a difference of the pole-pair number of the rotating magnetic field and the pole-pair number of the excitation magnetic field, thereby ensuring the normal operation of the electric motor 100 in different operational states.

Optionally, the excitation stator 10, the salient-pole rotor 20 and the excitation rotor 30 are sequentially spaced apart from the inside to the outside in the radial direction of the electric motor 100. Any two of the excitation stator 10, the salient-pole rotor 20 and the excitation rotor 30 are rotatable relative to each other, and the switching actuator 50 is configured to select at least one of the salient-pole rotor 20 and the excitation rotor 30 to serve as the rotor rotatable relative to the excitation stator 10 by selectively fixing the relative positions of two of the excitation stator 10, the salient-pole rotor 20 and the excitation rotor 30.

Figure 12:
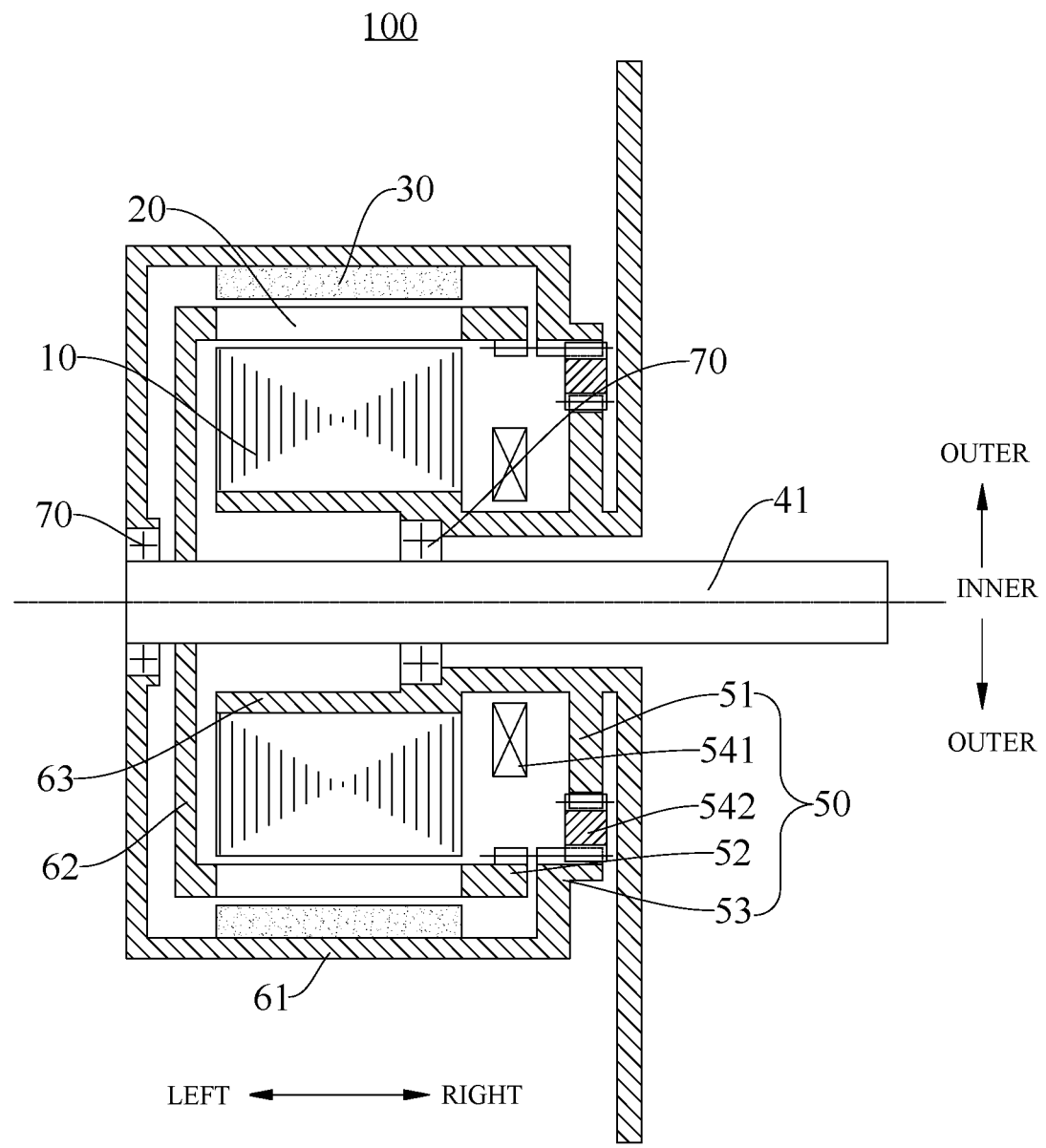
FIG. 12 is a schematic view of the electric motor shown in FIG. 11 when a switching actuator is in a first state.

In other words, the electric motor 100 mainly includes the excitation stator 10, the salient-pole rotor 20, the excitation rotor 30, and the switching actuator 50. The excitation stator 10, the salient-pole rotor 20 and the excitation rotor 30 substantially have a cylindrical structure extending in the axial direction (a left-right direction as illustrated in FIG. 12) of the electric motor 100; the salient-pole rotor 20 is located outside the excitation stator 10 and located inside the excitation rotor 30 in the radial direction of the electric motor 100; the excitation stator 10, the salient-pole rotor 20 and the excitation rotor 30 are coaxially arranged, and these three are spaced apart to avoid interference when any two of them are rotated relatively, which otherwise will affect the normal operation of the electric motor 100. Furthermore, any two of the excitation stator 10, the salient-pole rotor 20 and the excitation rotor 30 can rotate relative to each other, that is, the salient-pole rotor 20 can perform rotation relative to the excitation stator 10 or the excitation rotor 30, and at the same time, the excitation rotor 30 also can perform rotation relative to the salient-pole rotor 20 or the excitation stator 10.

Further, the switching actuator 50 can fix the relative positions of the excitation stator 10 and the excitation rotor 30, such that the salient-pole rotor 20 rotates relative to the excitation stator 10 and the excitation rotor 30, forming the rotor rotatable relative to the excitation stator 10; the switching actuator 50 also can fix the relative positions of the excitation rotor 30 and the salient-pole rotor 20, such that the salient-pole rotor 20 and the excitation rotor 30 rotate relative to the excitation stator 10, forming the rotor rotatable relative to the excitation stator 10; or the switching actuator 50 can fix the relative positions of the excitation stator 10 and the salient-pole rotor 20, such that the excitation rotor 30 can rotate relative to the excitation stator 10 and the salient-pole rotor 20 separately, forming the rotor rotatable relative to the excitation stator 10. Any rotor of the electric motor 100 in the three states can output torque, thereby achieving the switch among the three operation states of the electric motor 100. Moreover, the variable-pole variable-pressure operation of the electric motor 100 is realized without changing the winding connection of the electric motor 100, i.e. the control and adjustment in terms of the rotor pole number and the operational frequency of the electric motor 100 is realized.

Thus, when the electric motor 100 operates in the low-speed high-torque region, an operational state with a great number of equivalent pole pairs is employed, and the output torque is large; when the electric motor 100 operates in the high-speed operational region, an operational state with a small number of equivalent pole pairs is employed, requirements for the high speed operation are naturally met without the field weakening control, and the efficiency is greatly improved due to the reduced operational frequency. The equivalent rotor pole-pair numbers and the operational electric frequencies of the electric motor 100 in the three operational states are significantly different, the variable-pole variable-pressure operation is realized without changing winding connection of the electric motor 100, and the operational rotation speed range is broadened, thereby effectively improving the torque density and the high power density of the electric motor 100, and expanding the application range of the electric motor 100.

In the electric motor 100 according to embodiments of the present disclosure, by configuring any two of the excitation stator 10, the salient-pole rotor 20 and the excitation rotor 30 to be rotatable relative to each other, and by selectively fixing any two of them by means of the switching actuator 50, at least one of the salient-pole rotor 20 and the excitation rotor 30 can form the rotor rotatable relative to the excitation stator 10, such that without changing the winding connection of the electric motor 100, the control over and adjustment to the rotor pole number and the operational frequency of the electric motor 100 can be realized, and the switch of the optimal efficiency region of the electric motor 100 between the low-speed high-torque region and the high-speed low-torque region is realized, thereby effectively improving the torque density and the high power density of the electric motor 100 and expanding the application range of the electric motor 100. The electric motor 100 has the compact structure, the little space occupation, and the wide application range, and can realize the controlled adjustment to the rotor pole number and the operational frequency without changing the winding connection of the electric motor 100, and can output more torque and power compared to the electric motor 100 in the related art having the same overall volume, thus having advantages of high torque and high power density.

In some embodiments of the present disclosure, the switching actuator 50 is switchable between the first state and the second state, and one of the salient-pole rotor 20 and the excitation rotor 30 is adapted to be drivingly connected to the load. The switching actuator 50 fixes the relative positions of the excitation stator 10 and the other one of the salient-pole rotor 20 and the excitation rotor 30 when in the first state; the switching actuator 50 fixes the relative positions of the excitation rotor 30 and the salient-pole rotor 20 when in the second state.

Figure 13:
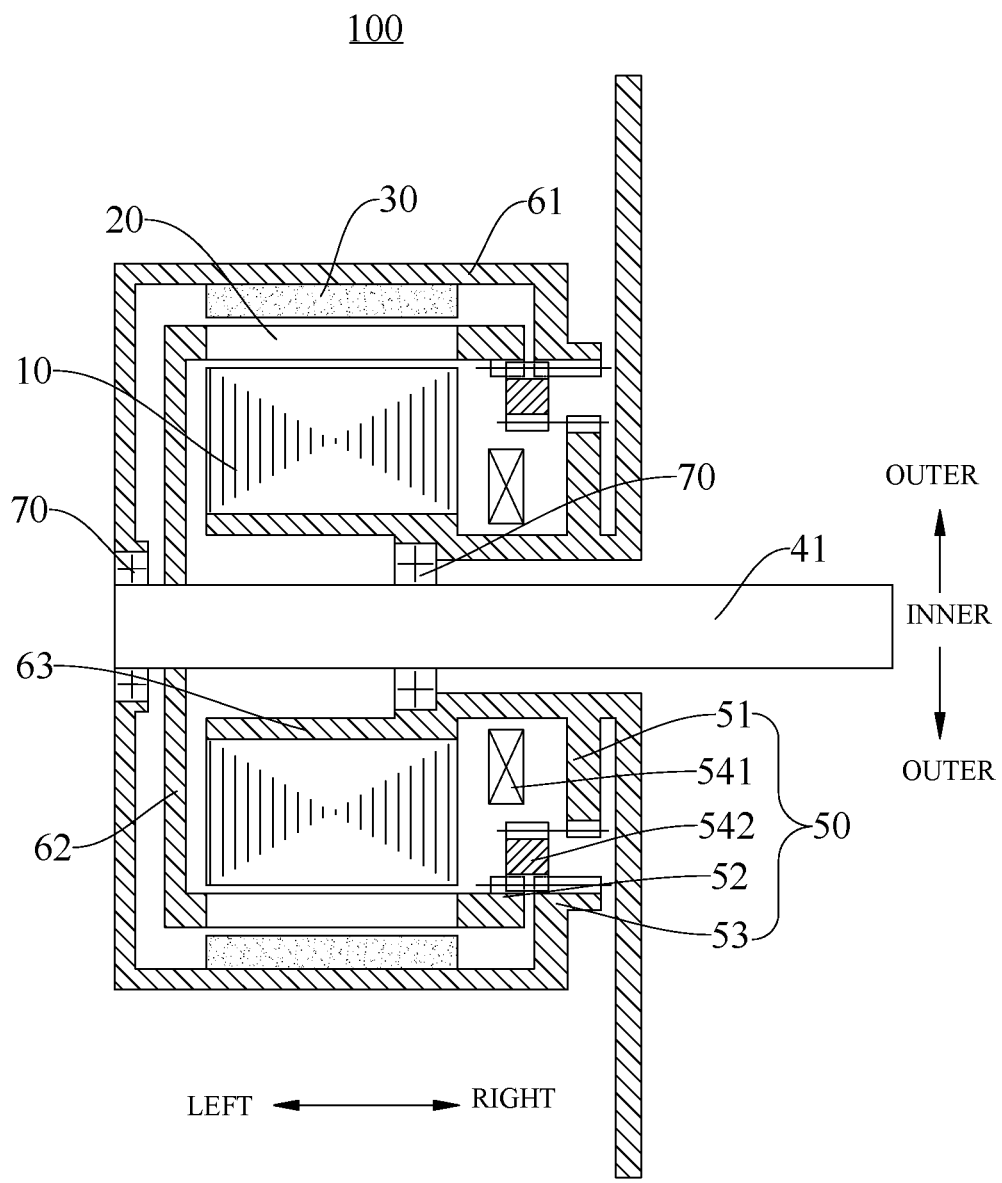
FIG. 13 is a schematic view of the electric motor shown in FIG. 11 when a switching actuator is in a second state.

Specifically, as illustrated in FIGS. 12 and 13, in the present embodiment, the load is drivingly connected to the salient-pole rotor 20, that is, the load and the salient-pole rotor 20 can be movable synchronously or immovable synchronously, while the switching actuator 50 can fix the relative positions of the excitation stator 10 and the excitation rotor 30, and also can fix the relative positions of the salient-pole rotor 20 and the excitation rotor 30.

As illustrated in FIG. 12, when the switching actuator 50 is in the first state, the switching actuator 50 fixedly connects the relative positions of the excitation stator 10 and the excitation rotor 30, such that the excitation stator 10 and the excitation rotor 30 are immovable synchronously, and the salient-pole rotor 20 forms the rotor rotatable relative to the excitation stator 10. As illustrated in FIG. 13, when the switching actuator 50 is in the second state, the switching actuator 50 fixedly connects the relative positions of the salient-pole rotor 20 and the excitation rotor 30, such that the salient-pole rotor 20 and the excitation rotor 30 can be movable or immovable synchronously, and the salient-pole rotor 20 and the excitation rotor 30 form the rotor rotatable relative to the excitation stator 10. In such a way, the switch of the electric motor 100 between the first state and the second state is realized, and the adjustment to the equivalent pole-pair number of the rotor and the operation point frequency is realized, thereby achieving the variable-pole variable-pressure operation of the electric motor 100.

Certainly, the present disclosure is not limited to this. In other examples of the present embodiment, the load is drivingly connected to the excitation rotor 30, that is, the load and the excitation rotor 30 can be movable synchronously or immovable synchronously, while the switching actuator 50 can fix the relative positions of the excitation stator 10 and the salient-pole rotor 20, and also can fix the relative positions of the excitation rotor 30 and the salient-pole rotor 20.

Figure 16:
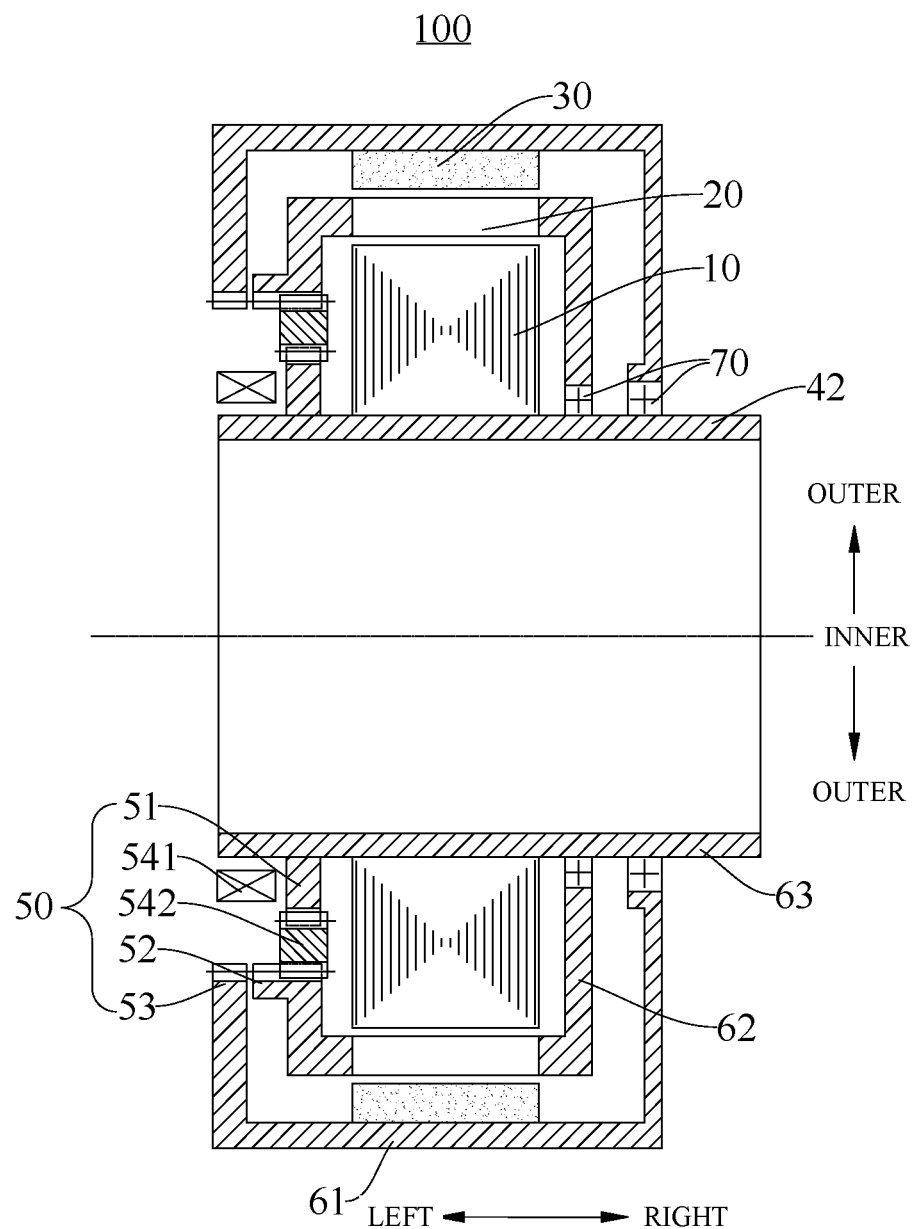
FIG. 16 is a schematic view of the electric motor shown in FIG. 15 when a switching actuator is in a first state.
Figure 17:
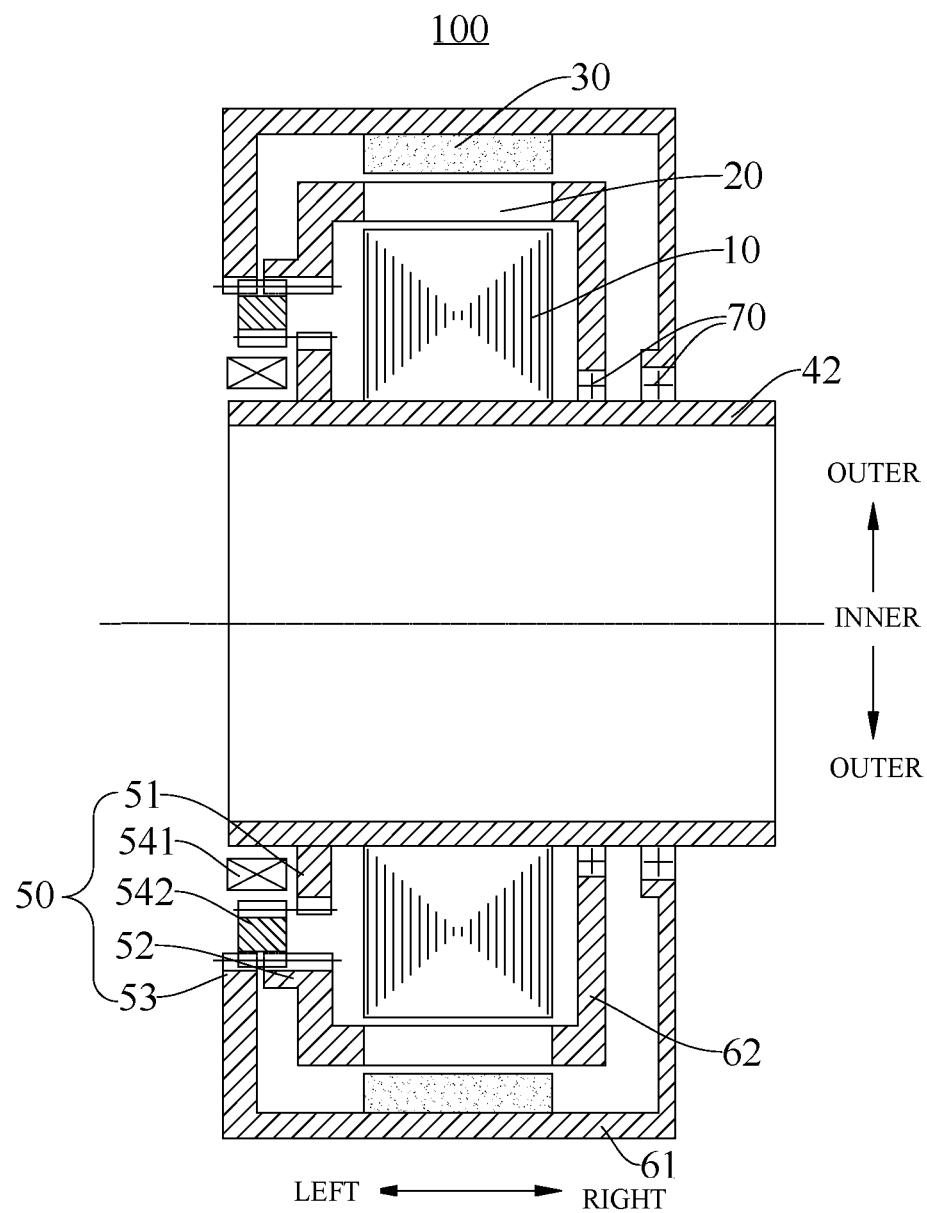
FIG. 17 is a schematic view of the electric motor shown in FIG. 15 when a switching actuator is in a second state.

As illustrated in FIG. 16, when the switching actuator 50 is in the first state, the switching actuator 50 fixedly connects the relative positions of the excitation stator 10 and the salient-pole rotor 20, such that the excitation stator 10 and the salient-pole rotor 20 are immovable synchronously, and the excitation rotor 30 forms the rotor rotatable relative to the excitation stator 10. As illustrated in FIG. 17, when the switching actuator 50 is in the second state, the switching actuator 50 fixedly connects the relative positions of the salient-pole rotor 20 and the excitation rotor 30, such that the salient-pole rotor 20 and the excitation rotor 30 can drive the load to be movable or immovable synchronously, and the salient-pole rotor 20 and the excitation rotor 30 form the rotor rotatable relative to the excitation stator 10. In such a way, the switch of the electric motor 100 between the first state and the second state is realized through the switching mechanism 50, and the adjustment to the equivalent pole-pair number of the rotor and the operation point frequency is realized, thereby achieving the variable-pole variable-pressure operation of the electric motor 100.

Thus, when the electric motor 100 operates in the low-speed high-torque region, an operational state with a great number of equivalent pole pairs is employed, and the output torque is large; when the electric motor 100 operates in the high-speed operational region, an operational state with a small number of equivalent pole pairs is employed, requirements for the high speed operation are naturally met without the field weakening control, and the efficiency is greatly improved due to the reduced operational frequency. The equivalent rotor pole-pair numbers and the operational electric frequencies of the electric motor 100 in the two operational states are significantly different, the variable-pole variable-pressure operation is realized without changing the winding connection of the electric motor 100, and the operational rotation speed range is broadened, thereby effectively improving the torque density and the high power density of the electric motor 100, and expanding the application range of the electric motor 100.

The switching actuator 50 includes the excitation stator fixing ring 51, the salient-pole rotor fixing ring 52, the excitation stator fixing ring 53, the driving part 541 and the sliding ring 542. Specifically, the relative positions of the excitation stator fixing ring 51 and the excitation stator 10 are fixed, the relative positions of the salient-pole rotor fixing ring 52 and the salient-pole rotor 20 are fixed, and the relative positions of the excitation rotor fixing ring 53 and the excitation rotor 30 are fixed. One of the salient-pole rotor fixing ring 52 and the excitation rotor fixing ring 53 is adapted to be drivingly connected to the load, and the sliding ring 542 is driven to slide by the driving part 541. When the switching actuator 50 is in the first state, the sliding ring 542 is fitted with the excitation stator fixing ring 51 and the other one of the salient-pole rotor fixing ring 52 and the excitation rotor fixing ring 53 separately under the drive of the driving part 541; when the switching actuator 50 is in the second state, the sliding ring 542 is fitted with the salient-pole rotor fixing ring 52 and the excitation rotor fixing ring 53 separately under the drive of the driving part 541.

Referring to FIGS. 12, 13, 16 and 17, the switching actuator 50 mainly includes the excitation stator fixing ring 51, the salient-pole rotor fixing ring 52, the excitation rotor fixing ring 53, the driving part 541 and the sliding ring 542. The excitation stator fixing ring 51 substantially has a cylindrical structure. The relative positions of the excitation stator fixing ring 51 and the excitation stator 10 are fixed, that is, the excitation stator fixing ring 51 and the excitation stator 10 are immovable synchronously. The relative positions of the salient-pole rotor fixing ring 52 and the salient-pole rotor 20 are fixed, and the salient-pole rotor fixing ring 52 and the salient-pole rotor 20 can either be movable synchronously or be immovable synchronously. The relative positions of the excitation rotor fixing ring 53 and the excitation rotor 30 are fixed, that is, the excitation rotor fixing ring 53 and the excitation rotor 30 can either be movable synchronously, or be immovable synchronously.

Optionally, as illustrated in FIG. 12, the salient-pole rotor 20 is drivingly connected to the load. When the switching actuator 50 is in the first state, the sliding ring 542 has the first end fitted with the excitation stator fixing ring 51 and the second end fitted with the excitation rotor fixing ring 53 under the drive of the driving part 541, such that the relative positions of the excitation stator 10 and the excitation rotor 30 are fixed (i e immovable synchronously), in which case the salient-pole rotor 20 forms the rotor rotatable relative to the excitation stator 10.

As illustrated in FIG. 13, when the switching actuator 50 is in the second state, the sliding ring 542 has the first end fitted with the salient-pole rotor fixing ring 52 and the second end fitted with the excitation rotor fixing ring 53 under the drive of the driving part 541, such that the relative positions of the salient-pole rotor 20 and the excitation rotor 30 are fixed (i.e. movable synchronously), in which case the salient-pole rotor 20 and the excitation rotor 30 form the rotor rotatable relative to the excitation stator 10.

Optionally, as illustrated in FIG. 16, the excitation rotor 30 is drivingly connected to the load. When the switching actuator 50 is in the first state, the sliding ring 542 has the first end fitted with the excitation stator fixing ring 51 and the second end fitted with the salient-pole rotor fixing ring 52 under the drive of the driving part 541, such that the relative positions of the excitation stator 10 and the salient-pole rotor 20 are fixed (i e immovable synchronously), in which case the excitation rotor 30 forms the rotor rotatable relative to the excitation stator 10. As illustrated in FIG. 17, when the switching actuator 50 is in the second state, the sliding ring 542 has the first end fitted with the salient-pole rotor fixing ring 52 and the second end fitted with the excitation rotor fixing ring 53 under the drive of the driving part 541, such that the relative positions of the salient-pole rotor 20 and the excitation rotor 30 are fixed (i.e. movable synchronously), in which case the salient-pole rotor 20 and the excitation rotor 30 form the rotor rotatable relative to the excitation stator 10.

Thus, the electric motor 100 according to the present disclosure can rapidly realize the switching between the first state and the second state through the switching actuator 50, such that without changing the winding connection of the electric motor 100, the control over and adjustment to the rotor pole number and the operational frequency of the electric motor 100 can be achieved, the output torque and power of the electric motor 100 is improved, the application range of the electric motor 100 is expanded.

Optionally, the driving part 541 is a control coil configured to drive the sliding ring 542 to slide by electromagnetic induction. By configuring the driving part 541 as the control coil configured to control the sliding of the sliding ring 542 through the electromagnetic induction, the wiring inside the electric motor 100 can be simplified, such that the overall structure of the electric motor 100 is simpler.

Preferably, the sliding ring 542, the excitation stator fixing ring 51, the salient-pole rotor fixing ring 52, and the excitation rotor fixing ring 53 are each provided with a latch. When the switching actuator 50 is in the first state, the latch of the sliding ring 542 is engaged with the latch of the excitation stator fixing ring 51 and the latch of the other one of the salient-pole rotor fixing ring 52 and the excitation rotor fixing ring 53 separately; when the switching actuator 50 is in the second state, the latch of the sliding ring 542 is engaged with the latch of the salient-pole rotor fixing ring 52 and the latch of the excitation rotor fixing ring 53 separately.

As illustrated in FIGS. 12 and 13, the sliding ring 542 substantially has a cylindrical structure. The inner wall and the outer wall of the sliding ring 542 having the cylindrical structure are provided with a latch respectively. The outer wall of the salient-pole rotor fixing ring 52 is provided with a latch. The inner wall of the excitation rotor fixing ring 53 is provided with a latch. The latch on the inner wall of the sliding ring 542 can be engaged and fitted with the latches on the outer walls of the salient-pole rotor fixing ring 52 and the excitation stator fixing ring 51, and the latch on the outer wall of the sliding ring 542 can be fitted with the latch on the inner wall of the excitation rotor fixing ring 53, such that the reliability of the connection between the sliding ring 542 and the excitation stator fixing ring 51 as well as the connection between the salient-pole rotor fixing ring 52 and the excitation rotor fixing ring 53 is enhanced by utilizing the fitting between the latches, thereby ensuring the normal operation of the electric motor 100.

Specifically, as illustrated in FIG. 12, when the switching actuator 50 is in the first state, the latch on the outer wall of the sliding ring 542 is engaged with the latch on the inner wall of the excitation rotor fixing ring 53, and the latch on the inner wall of the sliding ring 542 is engaged with the latch on the outer wall of the excitation stator fixing ring 51, such that the drive connection between the excitation rotor 10 and the excitation rotor 30 is ensured, and the excitation rotor 10 and the excitation rotor 30 are immovable synchronously. As illustrated in FIG. 13, when the switching actuator 50 is in the second state, the latch on the inner wall of the sliding ring 542 is disengaged from the latch on the outer wall of the excitation stator fixing ring 51, and the latch on the outer wall of the sliding ring 542 is engaged with the latch on the inner wall of the salient-pole rotor fixing ring 52 and the latch on the inner wall of the excitation rotor fixing ring 53 respectively, such that the drive connection between the salient-pole rotor 20 and the excitation rotor 30 is ensured, and the salient-pole rotor 20 and the excitation rotor 30 rotate synchronously.

Advantageously, according to an embodiment of the present disclosure, the switching actuator 50 is disposed outside the excitation stator 10 and adjacent to an end of the excitation stator 10. Specifically, as illustrated in FIG. 12, the switching actuator 50 is disposed at a right side of the excitation stator 10, and spaced apart from the excitation stator 10, facilitating control over the selective connection between the excitation rotor 30 and the excitation stator 10, and realizing the switch among the different states of the electric motor 100.

In addition, the electric motor 100 further includes an outer rotor housing 61, an inner rotor housing 62 and the stator housing 63. The excitation stator 10, the salient-pole rotor 20 and the excitation rotor 30 are all disposed in the outer rotor housing 61. The excitation rotor 30 is drivingly connected to the outer rotor housing 61, the salient-pole rotor 20 is drivingly connected to the inner rotor housing 62 and the inner rotor housing 62 is drivingly connected with the electric motor shaft 41 adapted to be drivingly connected to the load, the excitation stator 10 is drivingly connected to the stator housing 63, the excitation stator fixing ring 51 is drivingly connected to the stator housing 63, the salient-pole rotor fixing ring 52 is drivingly connected to the salient-pole rotor 20, and the excitation rotor fixing ring 53 is drivingly connected to the outer rotor housing 61.

Referring to FIGS. 12 and 13, the outer rotor housing 61 substantially has a cylindrical structure with an open end (e.g. a right end as illustrated in FIG. 12), and the excitation stator 10, the salient-pole rotor 20 and the excitation stator 10 are coaxially disposed in the outer rotor housing 61 and spaced apart sequentially from the inside to the outside in the radial direction of the stator housing 63, such that elements inside the electric motor 100 are protected by the outer rotor housing 61 from accidental damage. The excitation rotor fixing ring 53 is disposed at an end (e.g. a right end as illustrated in FIG. 12) of the outer rotor housing 61 and is integrally formed with the outer rotor housing 61.

The stator housing 63 has an annular structure extending in the axial direction of the electric motor 100. The stator housing 63 is disposed in the outer rotor housing 61, and an outer side wall of an end (e.g. a right end as illustrated in FIG. 12) of the stator housing 63 is provided with the excitation stator fixing ring 51 to be selectively and drivingly connected to a driving ring. The inner rotor housing 62 has an annular structure extending in the axial direction of the electric motor 100, and is located between the outer rotor housing 61 and the stator housing 63 in the radial direction of the electric motor 100. An end (e.g. a right end as illustrated in FIG. 12) of the inner rotor housing 62 is connected to the salient-pole rotor fixing ring 52.

In the present embodiment, there is no relative movement between the excitation stator 10 and the stator housing 63, the stator housing is in the fixed state, and the excitation stator 10 is also in the fixed state.

As illustrated in FIG. 12, when the switching actuator 50 is in the first state, the sliding ring 542 has the first end fitted with the excitation stator fixing ring 51 and the second end fitted with the excitation rotor fixing ring 53 under the drive of the driving part 541, such that the relative positions of the excitation stator 10 and the excitation rotor 30 are fixed (i.e. these two are immovable synchronously), in which case the salient-pole rotor 20 forms the rotor rotatable relative to the excitation stator 10. As illustrated in FIG. 13, when the switching actuator 50 is in the second state, the sliding ring 542 is fitted with the salient-pole rotor fixing ring 52 and the excitation rotor fixing ring 53 separately under the drive of the driving part 541, such that the relative positions of the salient-pole rotor 20 and the excitation rotor 30 are fixed (i.e. these two are movable synchronously), in which case the salient-pole rotor 20 and the excitation rotor 30 form the rotor rotatable relative to the excitation stator 10. The switch of the electric motor 100 between the first state and the second state is realized by the switching actuator 50, such that the adjustment to the equivalent pole-pair number of the rotor and the operational point frequency is realized, and the variable-pole variable-pressure operation of the electric motor 100 is realized.

Referring to FIGS. 12 and 13, the electric motor shaft 41 passes through the stator housing 63 and spaced apart from the stator housing 63, the inner rotor housing 62 is connected to the load through the electric motor shaft 41. The switching actuator 50 is disposed between the stator housing 63 and the inner rotor housing 62, and adjacent to an end of the excitation rotor 30, such that the circuit wiring of the switching actuator 50 can be simplified, and the reliability of the control of the switching actuator 50 can be enhanced. It is worth noting that, the switching actuator 50 may be electromagnetic, and may also be mechanical, which may be selected by those skilled in the art according to actual design requirements.

Preferably, the outer rotor housing 61 and the electric motor shaft 41, as well as the stator housing 63 and the electric motor shaft 41 are fitted by a bearing 70 therebetween, respectively. Specifically, as illustrated in FIGS. 12 and 13, the stator housing 63 and the electric motor shaft 41, as well as the outer rotor housing 61 and the electric motor shaft 41 are fitted by the bearing 70 therebetween respectively, so as to maintain the distance and the rotational independence between each other, which has a simple structure and will not form movement interference.

In some other specific embodiments of the present disclosure, the electric motor 100 further includes the outer rotor housing 61, and the inner rotor housing 62. The excitation stator 10, the salient-pole rotor 20 and the excitation rotor 30 are all disposed in the stator housing 63. The excitation stator 30 is drivingly connected to the outer rotor housing 61, the excitation stator 10 is drivingly connected with a fixed support shaft 42, the salient-pole rotor 20 and the fixed support shaft 42 are drivingly connected to the inner rotor housing 62 separately, the excitation stator fixing ring 51 is drivingly connected to the fixed support shaft 42, the salient-pole rotor fixing ring 52 is drivingly connected to the inner rotor housing 62, and the excitation rotor fixing ring 53 is drivingly connected to the outer rotor housing 61.

Specifically, as illustrated in FIGS. 16 and 17, the outer rotor housing 61 substantially has a cylindrical structure with an open end (e.g. a left end as illustrated in FIG. 16), and the excitation stator 10, the salient-pole rotor 20 and the excitation stator 10 are coaxially disposed in the outer rotor housing 61 and spaced apart sequentially from the inside to the outside in the radial direction of the stator housing 63, such that elements inside the electric motor 100 are protected by the outer rotor housing 61 from accidental damage. The excitation rotor fixing ring 53 is disposed at an end (such as the left end illustrated in FIG. 16) of the outer rotor housing 61 and is integrally formed with the outer rotor housing 61.

Meanwhile, the fixed support shaft 42 has an annular structure extending in the axial direction of the electric motor 100, the fixed support shaft 42 is disposed in the outer rotor housing 61, and an outer side wall of an end (e.g. a left end as illustrated in FIG. 16) of the fixed support shaft 42 is provided with the excitation stator fixing ring 51 to be selectively and drivingly connected to the driving ring, and the excitation stator 10 is fixedly disposed to the fixed support shaft 42. The inner rotor housing 62 has an annular structure extending in the axial direction of the electric motor 100, and is located between the outer rotor housing 61 and the fixed support shaft 42 in the radial direction of the electric motor 100. An end (e.g. a right end as illustrated in FIG. 12) of the inner rotor housing 62 is connected to the salient-pole rotor fixing ring 52.

As illustrated in FIG. 16, when the switching actuator 50 is in the first state, the sliding ring 542 has the first end fitted with the excitation stator fixing ring 51 and the second end fitted with the salient-pole rotor fixing ring 52 under the drive of the driving part 541, such that the relative positions of the excitation stator 10 and the salient-pole rotor 20 are fixed (i.e. these two are immovable synchronously), in which case the excitation rotor 30 forms the rotor rotatable relative to the excitation stator 10. As illustrated in FIG. 17, when the switching actuator 50 is in the second state, the sliding ring 542 is fitted with the salient-pole rotor fixing ring 52 and the excitation rotor fixing ring 53 separately under the drive of the driving part 541, such that the relative positions of the salient-pole rotor 20 and the excitation rotor 30 are fixed (i.e. these two are movable synchronously), in which case the salient-pole rotor 20 and the excitation rotor 30 form the rotor rotatable relative to the excitation stator 10. The switch of the electric motor 100 between the first state and the second state is realized by the switching actuator 50, such that the adjustment to the equivalent pole-pair number of the rotor and the operational point frequency is realized, and the variable-pole variable-pressure operation of the electric motor 100 is realized.

Optionally, the outer rotor housing 61 and the fixed support shaft 42, as well as the inner rotor housing 62 and the fixed support shaft 42 are fitted by the bearing 70 therebetween respectively, such that the distance and the rotational independence between the outer rotor housing 61 and the fixed support shaft 42, as well as between the inner rotor housing 62 and the fixed support shaft 42 is maintained.

According to an embodiment of the present disclosure, the fixed support shaft 42 is a hollow shaft with an annular cross section. That is, the fixed support shaft 42 forms a hollow shaft extending in the axial direction of the electric motor 100, and when the electric motor 100 is in operation, the fixed support shaft 42 is relatively motionless and only functions to support the excitation stator 10. By configuring the fixed support shaft 42 as the hollow shaft, a weight of the electric motor 100 can be reduced to facilitate achieving lightweight of the electric motor 100, and the material cost can also be reduced to improve cost performance of the electric motor 100. In the present embodiment, when the electric motor 100 switches between the two operational states, the excitation rotor 30 both serves as the rotor of the electric motor 100, the outer rotor housing 61 rotates along with the excitation rotor 30 to output the torque, and the load is connected to the outer rotor housing 61.

Optionally, the excitation stator 10 includes the stator permeable core 11 and the stator winding 12, and the stator winding 12 is wound around the stator permeable core 11.

Figure 11:
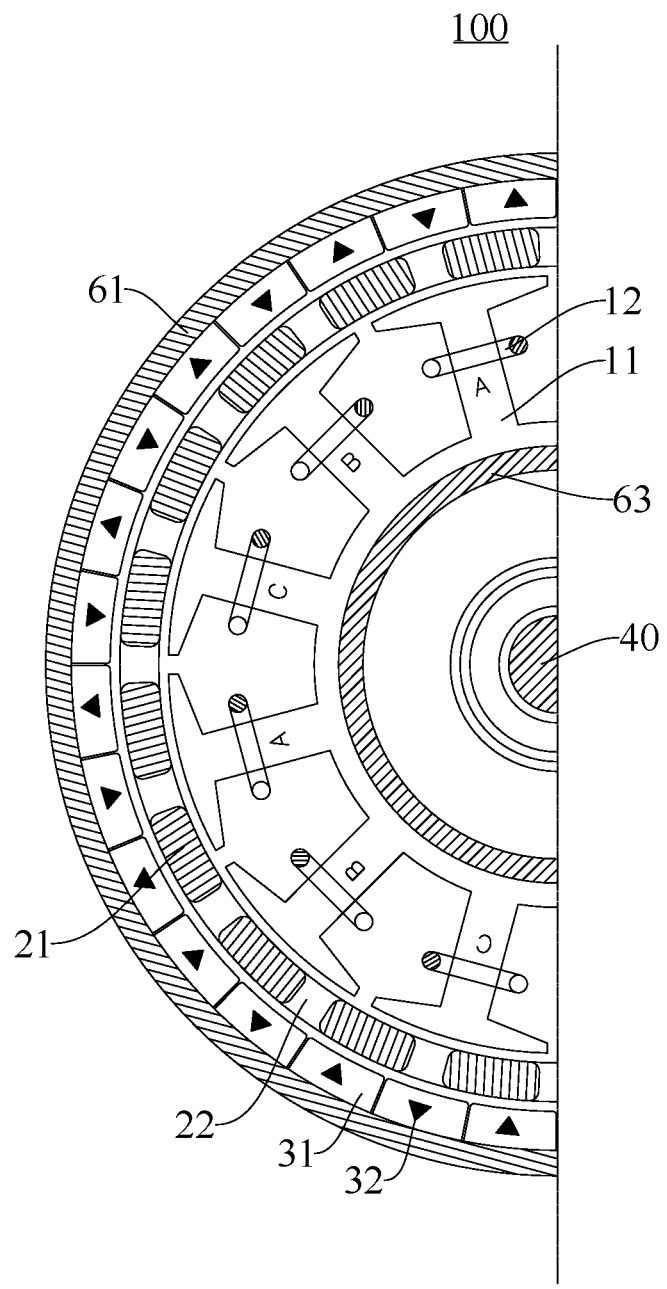
FIG. 11 is a half sectional view of an electric motor according to an embodiment of the present disclosure.

Referring to FIGS. 11 and 12, the excitation stator 10 mainly includes the stator permeable core 11 and the stator winding 12, and the stator permeable core 11 is constituted by a high-permeability material. The high-permeability material may be silicon steel sheet, cobalt sheet steel, permalloy, SMC, etc. The stator winding 12 is wound around the stator permeable core 11. The stator winding 12 may be a concentrated winding (as illustrated in FIG. 11), and may also be a distributed winding (as illustrated in FIG. 16). That is to say, a span of the stator winding 12 may be 1 or another integer, and at the same time, the number of phases of the stator winding 12 may be monophase or polyphase, such that the stator winding 12 is supplied with an AC current to generate a magnetic field. It is worth noting that, the specific material of the stator permeable core 11, the winding form of the stator winding 12, and the number of phases of the stator winding 12 may be adaptively selected according to actual design requirements, so as to ensure the torque and the power density of the electric motor 100.

The excitation rotor 30 includes the rotor permeable core 31 and the permanent magnet 32, and the permanent magnet 32 is disposed to the rotor permeable core 31.

In other words, the excitation rotor 30 mainly includes the rotor permeable core 31 and the permanent magnet 32, and the permanent magnets 32 are disposed to the rotor permeable core 31, and evenly arranged in the circumferential direction of the rotor permeable core 31. The rotor permeable core 31 is constituted by a high-permeability material. The high-permeability material may be silicon steel sheet, cobalt sheet steel, permalloy, SMC, etc. The permanent magnet 32 is mainly constituted by a permanent magnetic material, and the permanent magnetic material may be neodymium iron boron, ferrite, alnico, samarium cobalt, etc. The permanent magnet 32 may be joined to the rotor permeable core 31 by ways of surface mounting (SPM), built-in (IPM), surface insetting (Inset PM), or the like. For example, in an example of the present disclosure, the permanent magnet 32 is embedded in the rotor permeable core 31 with the same polarities opposite to each other, thereby ensuring the stable structure of the excitation rotor 30 so as to generate the excitation magnetic field.

Optionally, each permanent magnet 32 substantially has a strip-shaped structure. A plurality of strip-shaped permanent magnets 32 are embedded in the rotor permeable core 31 and spaced apart in the circumferential direction with the same polarities opposite to each other.

Figure 18:
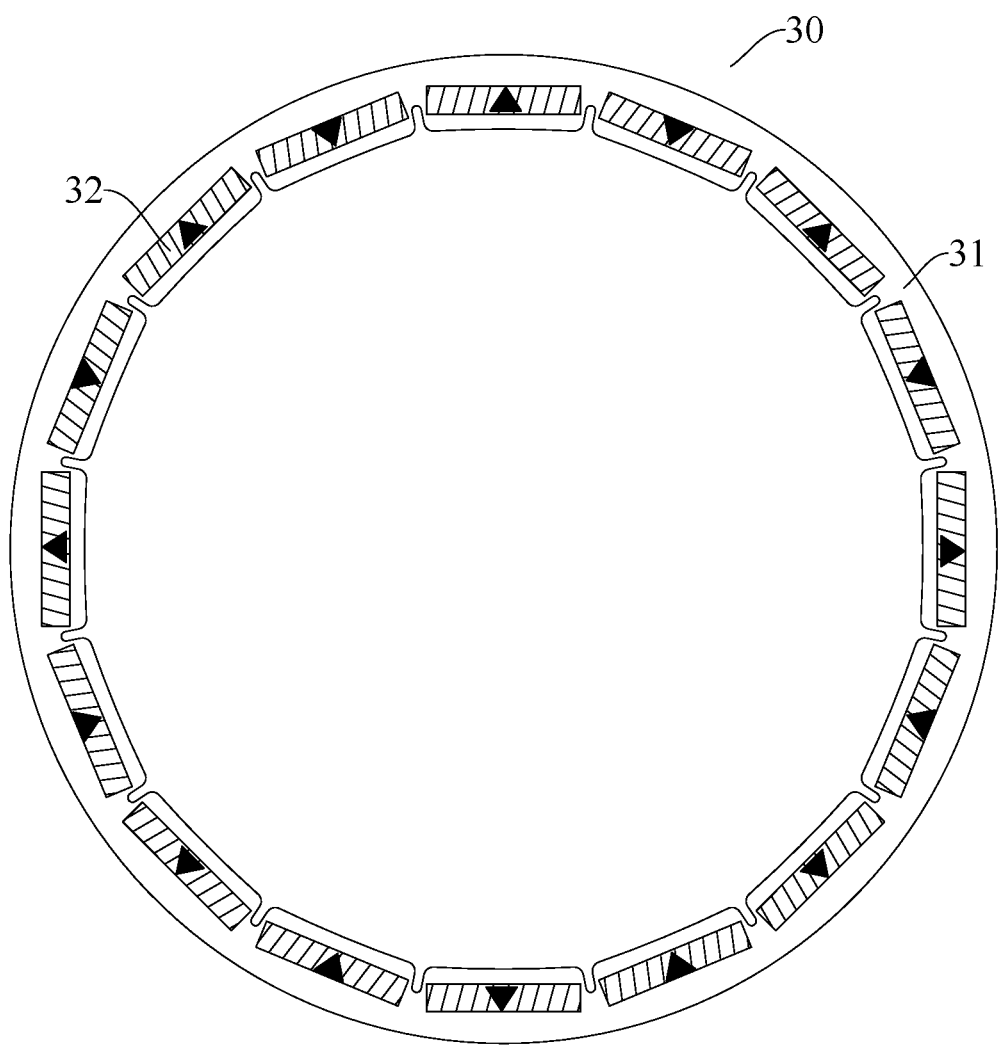
FIG. 18 is a schematic view of an excitation rotor of an electric motor according to an embodiment of the present disclosure.

As illustrated in FIG. 18, in the present embodiment, the rotor permeable core 31 has a circular ring shape extending in the circumferential direction of the electric motor 100. The rotor permeable core 31 is provided with a plurality of permanent magnets 32 spaced apart, each permanent magnet 32 is embedded in the rotor permeable core 31, each permanent magnet 32 has a strip shape, and a long edge of the permanent magnet 32 and the radial direction of the rotor permeable core 31 are perpendicular to each other.

Figure 19:
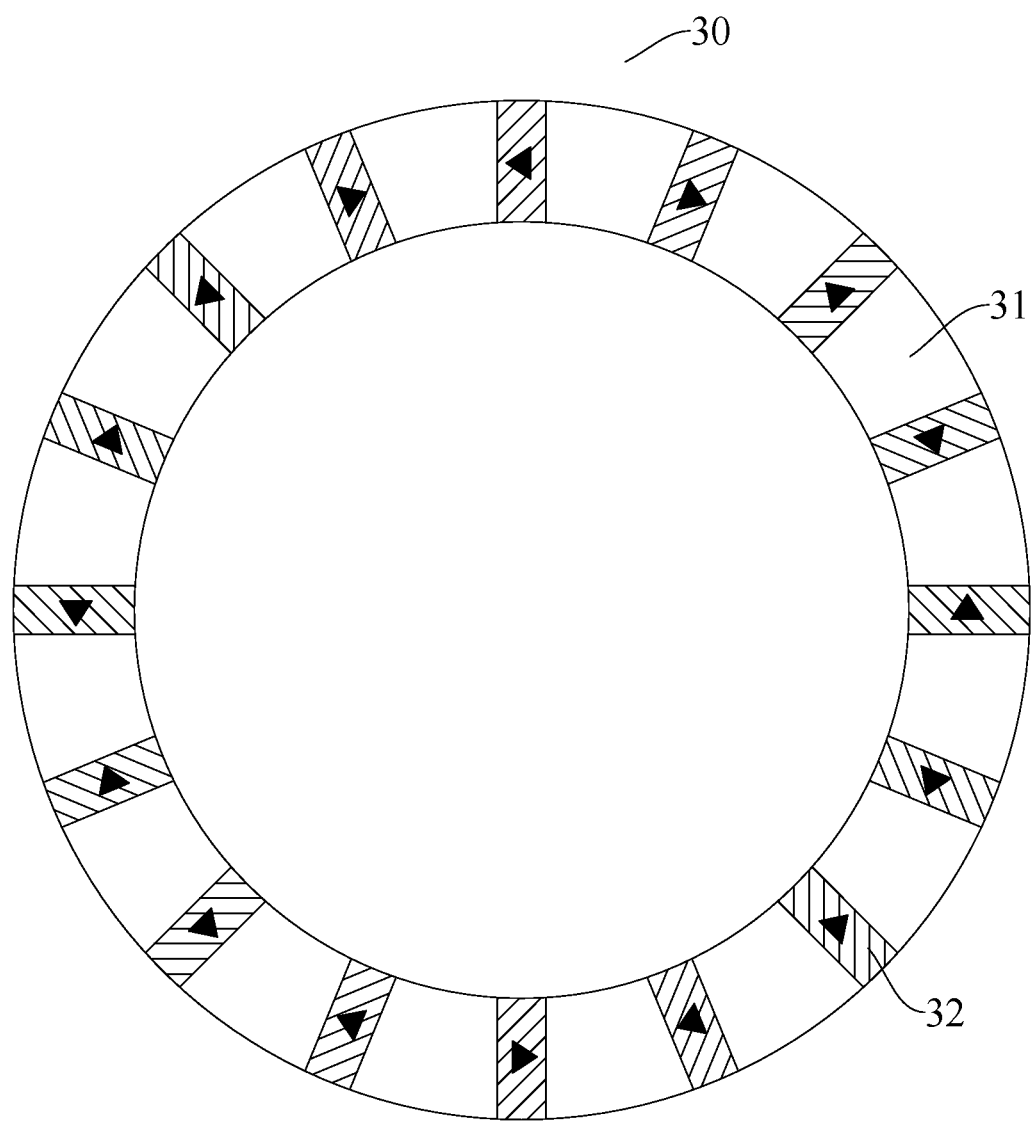
FIG. 19 is a schematic view of an excitation rotor of an electric motor according to another embodiment of the present disclosure.

As illustrated in FIG. 19, in the present embodiment, the rotor permeable core 31 has a circular ring shape extending in the circumferential direction of the electric motor 100. The rotor permeable core 31 is provided with a plurality of permanent magnets 32 spaced apart, a length direction of each permanent magnet 32 extends in the radial direction of the electric motor 100, and a length size of each permanent magnet 32 is equal to a thickness of the rotor permeable core 31 in the radial direction of the electric motor 100.

Figure 20:
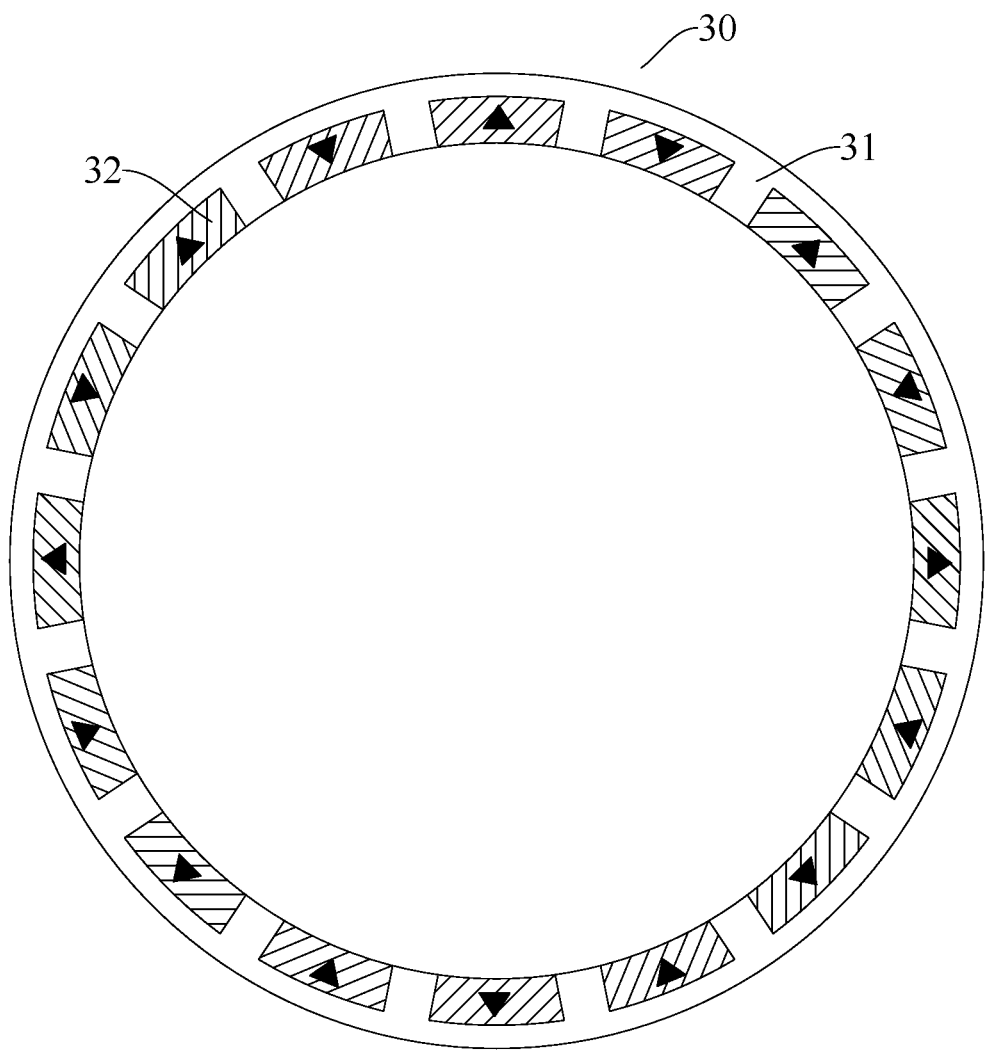
FIG. 20 is a schematic view of an excitation rotor of an electric motor according to still another embodiment of the present disclosure.

As illustrated in FIG. 20, in the present embodiment, the rotor permeable core 31 has a circular ring shape extending in the circumferential direction of the electric motor 100. The rotor permeable core 31 is provided with a plurality of permanent magnets 32 spaced apart, each permanent magnet 32 is configured as an arc block extending in the circumferential direction of the rotor permeable core 31, and each permanent magnet 32 is disposed adjacent to an inner side wall of the rotor permeable core 31. It is worth noting that, the number, shape and arrangement of the permanent magnets 32 can be changed by those skilled in the art according to actual design requirements, to adjust the equivalent pole-pair number of rotor and the operational electric frequency, such that the variable-pole variable-pressure operation can be realized by switching different operational states (e.g. the first state and the second state) of the electric motor 100 at the same output mechanical speed.

The salient-pole rotor 20 includes a plurality of permeable cores 21 and a plurality of non-permeable spacer blocks 22, and the plurality of permeable cores 21 and the plurality of non-permeable spacer blocks 22 are alternately arranged in the circumferential direction of the electric motor 100.

Referring to FIG. 11, the salient-pole rotor 20 mainly includes the plurality of permeable cores 21 and the plurality of non-permeable spacer blocks 22, and the plurality of permeable cores 21 and the plurality of non-permeable spacer blocks 22 are alternately arranged in the circumferential direction of the electric motor 100. The permeable core 21 is constituted by a high-permeability material. The high-permeability material may be silicon steel sheet, cobalt sheet steel, permalloy, SMC, etc. The non-permeable spacer block 22 is constituted by a non-permeable material, and the non-permeable material may be air, plastic, high-molecular polymer, non-permeable metal, etc.

Advantageously, according to an embodiment of the present disclosure, the excitation stator 10 is driven by an alternate current, and the pole-pair number of the rotating magnetic field generated by the excitation staro is denoted by $p_s$, the pole-pair number of the excitation magnetic field generated by the excitation rotor 30 is denoted by $p_f$, the number of the permeable cores 21 is denoted by $p_r$, in which $p_r = |p_s \pm p_f|$.

Specifically, the excitation stator 10 is driven by the alternate current, and generates the rotating magnetic field with the pole-pair number being ps, the excitation rotor 30 generates the excitation magnetic field with the pole-pair number being pf, and the number of the permeable cores 21 is pr. Meanwhile, the number of the permeable cores 21 equals to a sum or a difference of the pole-pair number of the rotating magnetic field and the pole-pair number of the excitation magnetic field, thereby ensuring the normal operation of the electric motor 100 in different operational states.

The electric motor according to embodiments of the present disclosure will be described by means of a plurality of specific embodiments in the following with reference to FIGS. 1 to 20.

The variable-pole variable-pressure electric motor 100 mainly contains a three-layer main structure and one switching actuator 50. The three-layer main structure contains the fixed excitation stator 10, the salient-pole rotor 20 with variable rotation state, and the excitation rotor 30 with variable rotation state. The excitation stator 10 and the excitation rotor 30 are located at the innermost layer and the outermost layer of the three-layer main structure of the whole electric motor 100 respectively, the salient-pole rotor 20 is located at the middle layer of the three-layer main structure of the whole electric motor 100, and the salient-pole rotor 20 is separately isolated from the excitation stator 10 and the excitation rotor 30 by an air gap.

The excitation stator 10 contains the stator permeable core 11 constituted by the high-permeability material (including but not limited to the silicon steel sheet, the cobalt sheet steel, the permalloy, the SMC, etc.) and the stator winding 12 wound around the stator permeable core. The stator winding 21 may be a concentrated winding or a distributed winding, that is, the span of the stator winding 12 may be 1 or another integer. The number of phases of the stator winding 12 may be monophase or polyphase. The number of slots of the stator permeable core 11 is denoted by Ns. The stator winding 12 may be driven by polyphase AC current corresponding to the number of phases of the winding, so as to generate a magnetic field with the pole pair being ps.

The excitation form of the excitation rotor 30 is the permanent magnetic form. The excitation rotor 30 of the permanent magnetic form contains the rotor permeable core 31 constituted by the high-permeability material (including but not limited to the silicon steel sheet, the cobalt sheet steel, the permalloy, the SMC, etc.) and the permanent magnet 32 constituted by the permanent magnetic material (including but not limited to the neodymium iron boron, ferrite, alnico, samarium cobalt, etc.). The joining method of the rotor permeable core 31 and the permanent magnet 32 can employ all rotor forms of the permanent-magnet electric motor 100, mainly containing but not limited to surface mounting (SPM), built-in (IPM), surface insetting (Inset PM), or the like, so as to generate the excitation magnetic field with the pole pair being pf.

The salient-pole rotor 20 contains the permeable core 21 constituted by the high-permeability material (including but not limited to the silicon steel sheet, the cobalt sheet steel, the permalloy, the SMC, etc.) and the non-permeable spacer block 22 constituted by the non-permeable material (including but not limited to the air, the plastic, the high-molecular polymer, the non-permeable metal, etc.). The permeable core 21 and the spacer block are alternately spaced apart to form the salient-pole rotor 20, and the number of the permeable core 21 is denoted by pr, and relationship of pr, ps, and pf meets pr=|ps±pf|.

The switching actuator 50 may be electromagnetic or mechanical, and its function is to switch composing form of the rotation component of the electric motor 100 among three operational states. In the first operational state, the excitation stator 10 and the excitation rotor 30 are stationary to serve as the stator of the electric motor 100, the salient-pole rotor 20 is the rotation component to serve as the rotor of the electric motor 100; the number of equivalent rotor poles of the electric motor 100 in the first operational state is pr, the operational electric frequency of the electric motor 100 is ωnpr, ωn is a mechanical rotation speed of the output shaft of the electric motor 100. In the second operational state, the excitation stator 10 is stationary to serve as the stator of the electric motor 100, and the excitation rotor 30 and the salient-pole rotor 20 is connected as rotation component to serve as the rotor of the electric motor 100; the equivalent rotor pole number of the electric motor 100 in the second operational state is ps, the operational electric frequency of the electric motor 100 is amps. In the third operational state, the excitation stator 10 and the salient-pole rotor 20 are stationary to serve as the stator of the electric motor 100, the excitation rotor 30 is the rotation component to serve as the rotor of the electric motor 100; the equivalent rotor pole number of the electric motor 100 in the third operational state is pf, and the operational electric frequency of the electric motor 100 is ωnpf. When the output mechanical rotation speed of the electric motor 100 is the same, the ratio of the equivalent rotor pole-pair number to the operational electric frequency among the above three operational states is ps:pr:pf, such that the variable-pole variable-pressure operation can be realized by switching the different operational states of the electric motor 100.

Embodiment 1

Specifically, as illustrated in FIGS. 1 to 3, the electric motor 100 of the present embodiment is a three-layer structure. The excitation stator 10 is disposed at the outermost layer and is a fixed component without rotation. The excitation stator 10 contains the stator permeable core 11, the stator winding 12, and the stator housing 63. The number of slots of the stator permeable core Ns=24, the stator winding 12 is a three-phase concentrated winding, and the span of a coil is 1. The stator winding 12 generates the rotating magnetic field of the excitation stator with the pole-pair number ps=8 when the stator winding 12 is applied with symmetrical three-phase current. The salient-pole rotor 20 contains the permeable core 21 and the non-permeable spacer block 22, the salient-pole rotor is directly connected to the electric motor shaft 41 through the end cap 64, and the number of the permeable cores 21 pr=20. The excitation rotor 30 contains the rotor permeable core 31, and the permanent magnet 32. The permanent magnet 32 is embedded in the rotor permeable core 31 with the same polarities opposite to each other, such that the excitation rotor 20 generates the excitation magnetic field with the pole-pair number pf=12. The excitation stator 10, the excitation rotor 30, the salient-pole rotor 20 and the electric motor shaft 41 maintain the distance and the rotational independence between each other by the bearing 70 therebetween.

The switching actuator 50 is located in an interior of the excitation rotor 30, and contains the control coil 541, the sliding ring 542, the excitation stator fixing ring 51, the salient-pole rotor fixing ring 52 and the excitation rotor fixing ring 53. The sliding ring 542 is a gear ring having teeth both on radially inner side and outer side, the excitation rotor fixing ring 53 is a gear ring having teeth on the radially inner side, and the excitation stator fixing ring 51 and the salient-pole rotor fixing ring 52 are gear rings having teeth on the radially inner side.

FIG. 2 shows the first operational state of the electric motor 100 of the present embodiment, in this state, the sliding ring 542 slides towards a shaft non-protruding side of the electric motor under the drive generated by the control coil 541, and engages the excitation stator fixing ring 51 and the excitation rotor fixing ring 53 together. In this state, the excitation rotor 30 becomes a fixed component and maintains a fixed position relative to the excitation stator 10, and the salient-pole rotor in this state is configured as the only rotation component of this electric motor. In the present embodiment, in the first operational state, the equivalent operational rotor pole-pair number of the electric motor is the number of the salient-pole rotor 20, pr=20, and the electric frequency of the electric motor at a rotation speed of 600 rpm is 200 Hz.

FIG. 3 shows the second operational state of the electric motor 100 of the present embodiment, in this state, the control coil 542 drives the sliding ring 542 to slide to a shaft protruding end of the electric motor, and engage the excitation rotor fixing ring 53 and the salient-pole rotor fixing ring 52 together. In this state, the excitation rotor 30 and the salient-pole rotor 20 maintain fixed relative positions and become the rotation component of the electric motor. In the present embodiment, the equivalent operational rotor pole-pair number of the electric motor in the second operational state is ps=8, and the electric frequency of the electric motor at the rotation speed of 600 rpm is just 80 Hz.

Figure 4:
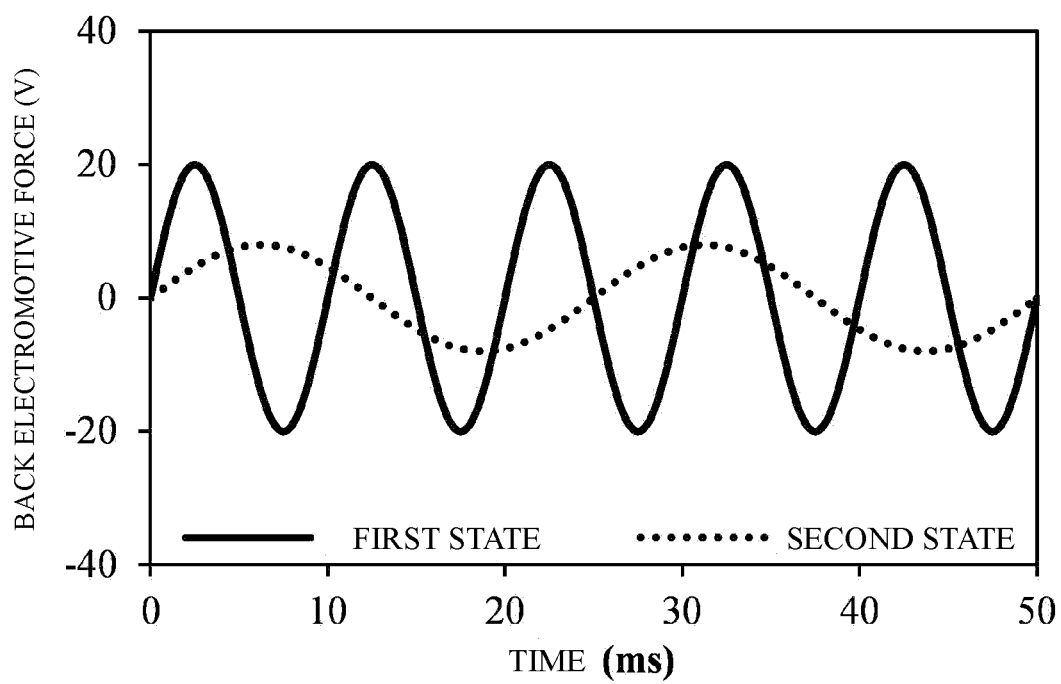
FIG. 4 is a comparison diagram of back electromotive forces of the electric motor shown in FIG. 1 in different states.

A comparison of back electromotive forces (back-EMF) of a no-load winding of the electric motor 100 of the present embodiment in the first and second operational states with the rotation speed of the electric motor shaft 41 being 600 rpm is as illustrated in FIG. 4, and the difference of the pole-pair numbers and terminal voltages of the electric motor 100 in the two operation states can be obviously seen from the figure. The ratio of the equivalent pole-pair numbers to the operational frequencies of the electric motor in the two operational states is 5:2.

Embodiment 2

As illustrated in FIGS. 5 to 7, the electric motor 100 of the present embodiment is the three-layer annular structure. The excitation stator 10 is disposed at the outermost layer and is a fixed component without rotation. The excitation stator 10 contains the stator permeable core 11, the stator winding 12, and the stator housing 63. The number of slots of the stator permeable core Ns=24, the stator winding 12 is a three-phase distributed winding, and the span of a coil is 5. The stator winding 12 generates the rotating magnetic field of the excitation stator with the pole-pair number ps=4 when the stator winding 12 is applied with symmetrical three-phase current. The salient-pole rotor 20 contains the permeable core 21 and the non-permeable spacer block 22, and the number of the permeable cores 21 pr=16. The excitation rotor 30 contains the rotor permeable core 31, and the permanent magnet 32. The permanent magnet 32 is embedded in the rotor permeable core 31 with the same polarities opposite to each other, such that the excitation rotor 30 generates the excitation magnetic field with the pole-pair number pf=12, and the excitation rotor 30 is directly connected to the electric motor shaft 41. The excitation stator 10, the excitation rotor 30, the salient-pole rotor 20 and the electric motor shaft 41 maintain the distance and the rotational independence between each other by the bearing 40 therebetween.

In the present embodiment, the switching actuator 50 is located at an end of the electric motor, and contains the control coil 541, the sliding ring 542, the excitation stator fixing ring 51, the salient-pole rotor fixing ring 52 and the excitation rotor fixing ring 53. The sliding ring 542 is a gear ring having teeth both on radially inner side and outer side, the excitation stator fixing ring 51 and the excitation rotor fixing ring 53 are gear rings having teeth on the radially outside side, and the salient-pole rotor fixing ring 52 is a gear ring having teeth on the radially inner side.

FIG. 6 shows the third operational state of the electric motor 100 of the present embodiment, in this state, the sliding ring 542 slides towards the shaft non-protruding side of the electric motor under the drive generated by the control coil 541, and engages the excitation stator fixing ring 51 and the salient-pole rotor fixing ring 52 together. In this state, the salient-pole rotor 20 becomes the fixed component and maintains the fixed position relative to the excitation stator 10, and the excitation rotor 30 in this state is configured as the only rotation component of this electric motor. In the present embodiment, in the third operational state, the equivalent operational rotor pole-pair number of the electric motor is pf=12, and the electric frequency of the electric motor at the rotation speed of 600 rpm is 120 Hz.

FIG. 7 shows the second operational state of the electric motor 100 of the present embodiment, in this state, the control coil 542 drives the sliding ring 542 to slide to the shaft protruding end of the electric motor, and to engage the excitation rotor fixing ring 53 and the salient-pole rotor fixing ring 52 together. In this state, the excitation rotor 30 and the salient-pole rotor 20 maintain the fixed relative positions and become the rotation component of the electric motor. In the present embodiment, the equivalent operational rotor pole-pair number of the electric motor in the second operational state is ps=4, and the electric frequency of the electric motor at the rotation speed of 600 rpm is just 40 Hz.

The ratio of the equivalent pole-pair numbers to the operational frequencies of the present embodiment in the third and second operational states is 3:1. The electric motor 100 of the above-described two embodiments both have two operation states, and can realize free switch between the two operation states, facilitating the operation.

Additionally, taking pf=4 as an example, other typical implementing forms of the excitation rotor 30 of the present disclosure besides the description of the aforementioned embodiments are as illustrated in FIGS. 8 and 10, that is, the permanent magnet 32 of the excitation rotor 30 is arc-shaped.

In the electric motor 100 according to embodiments of the present disclosure, the switching actuator 50 can realize the control over and adjustment to the rotor pole number and the operational frequency of the electric motor 100 without changing the winding connection of the electric motor 100, such that the switch of the optimal efficiency region of the electric motor 100 between the low-speed high-torque region and the high-speed low-torque region is realized, thereby effectively improving the torque density and the high power density of the electric motor 100 and expanding the application range of the electric motor 100. The electric motor 100 has the compact structure, the little space occupation, and the wide application range, and can realize the controlled adjustment to the rotor pole number and the operational frequency without changing the winding connection of the electric motor 100, thus having advantages of high torque and high power density.

Embodiment 3

As illustrated in FIGS. 11 to 13, in the present embodiment, the excitation stator 10 is at the innermost layer of the three-layer main structure of the overall electric motor 100, and is the fixed component without rotation. The excitation stator 10 contains the stator permeable core 11, the stator winding 12, and the stator housing 63. The number of slots of the stator permeable core Ns=12, the stator winding 12 is the three-phase concentrated winding, and the span of a coil is 1. The stator winding 12 generates the rotating magnetic field of the excitation stator 10 with the pole-pair number ps=4, when the stator winding 12 is applied with symmetrical three-phase current.

The salient-pole rotor 20 contains the permeable core 21, the non-permeable spacer block 22, and the inner rotor housing 62, the inner rotor housing 62 is directly connected to the electric motor shaft 41, and the number of the permeable cores 21 pr=20. The excitation rotor 30 contains the rotor permeable core 31, the permanent magnet 32 and the outer rotor housing 61. The permanent magnet 32 is mounted at the inner side of the rotor permeable core 31 with the same polarities spaced apart, such that the excitation rotor 30 generates the excitation magnetic field with the pole-pair number pf=16. The excitation stator 10, the excitation rotor 30, the salient-pole rotor 20 and the electric motor shaft 41 maintain the distance and the rotational independence between each other by the bearing 70 therebetween.

The switching actuator 50 contains the control coil, the sliding ring 542, the excitation stator fixing ring 51, the salient-pole rotor fixing ring 52 and the excitation rotor fixing ring 53. The sliding ring 542 is a gear ring having latches both on radially inner side and outer side, the excitation stator fixing ring 51 is a gear ring having latches on the radially outer side, and the salient-pole rotor fixing ring 52 and the excitation rotor fixing ring 53 are gear rings having latches on the radially inner side.

As illustrated in FIG. 12, in the first operational state of the electric motor 100, the sliding ring 542 engages the excitation rotor fixing ring 53 and the excitation stator fixing ring 51 together under controlling of the control coil. In this state, the excitation rotor 30 and the excitation stator 10 maintain fixed relative positions to serve as the stator of the electric motor 100, and the salient-pole rotor 20 serves as the rotor of electric motor 100. In this state, the equivalent operational rotor pole-pair number of the electric motor 100 is ps=20, and the electric frequency of the electric motor 100 at the rotation speed of 600 rpm is 200 Hz.

As illustrated in FIG. 13, in the second operational state of the electric motor 100, the sliding ring 542 disconnects the excitation rotor fixing ring 53 and the excitation stator fixing ring 51, and at the same time, the sliding ring 542 engages the excitation rotor fixing ring 53 and the salient-pole rotor fixing ring 52. In this state, the salient-pole rotor 20 and the excitation rotor 30 will maintain the fixed relative positions to serve as the rotor of the electric motor 100, and the excitation stator 10 serves as the stator of electric motor 100. In this state, the equivalent operational rotor pole-pair number of the electric motor 100 is ps=4, and the electric frequency of the electric motor 100 at the rotation speed of 600 rpm is 40 Hz.

Figure 14:
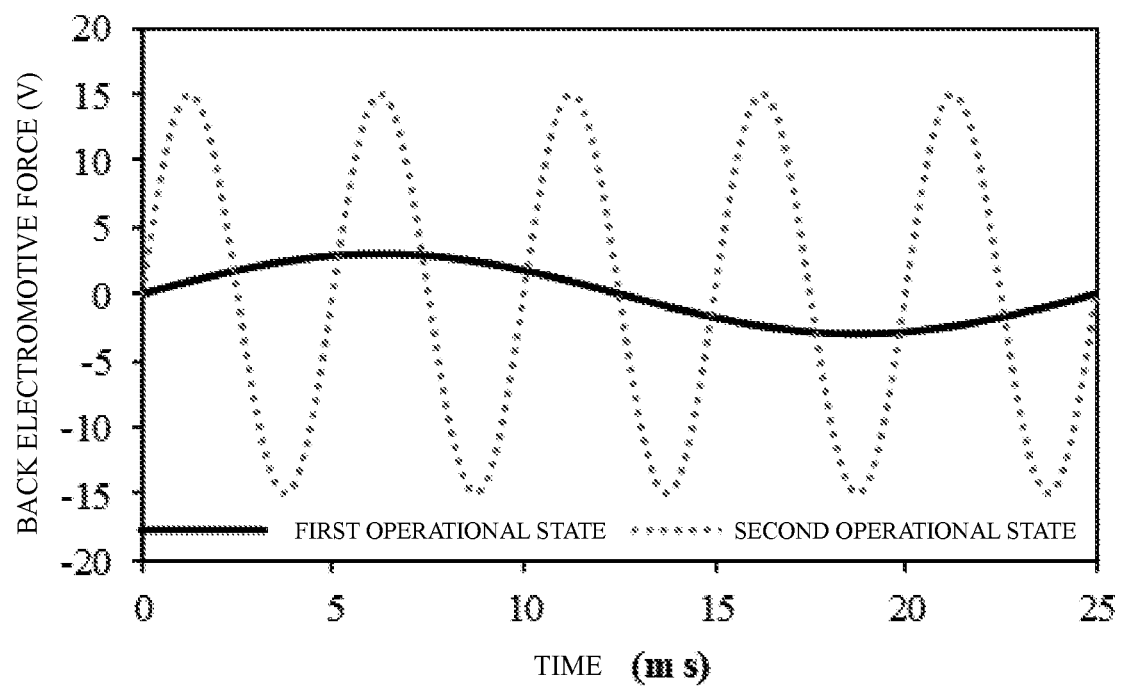
FIG. 14 is a graph illustrating comparison of the number of pole pairs and a terminal voltage of an electric motor in two operation states, according to an embodiment of the present disclosure.

A comparison of back electromotive forces (back-EMF) of a no-load winding of the electric motor 100 of the present embodiment in the first and second operational states with the rotation speed of a rotary shaft being 600 rpm is as illustrated in FIG. 14, and the difference of the pole-pair numbers and terminal voltages of the electric motor 100 in the two operation states can be obviously seen from FIG. 14. The ratio of the equivalent pole-pair numbers to the operational frequencies of the electric motor 100 in the two operational states is 5:1.

The embodiment 3 of the present disclosure does not include the third operational state of the present disclosure.

Embodiment 4

Figure 15:
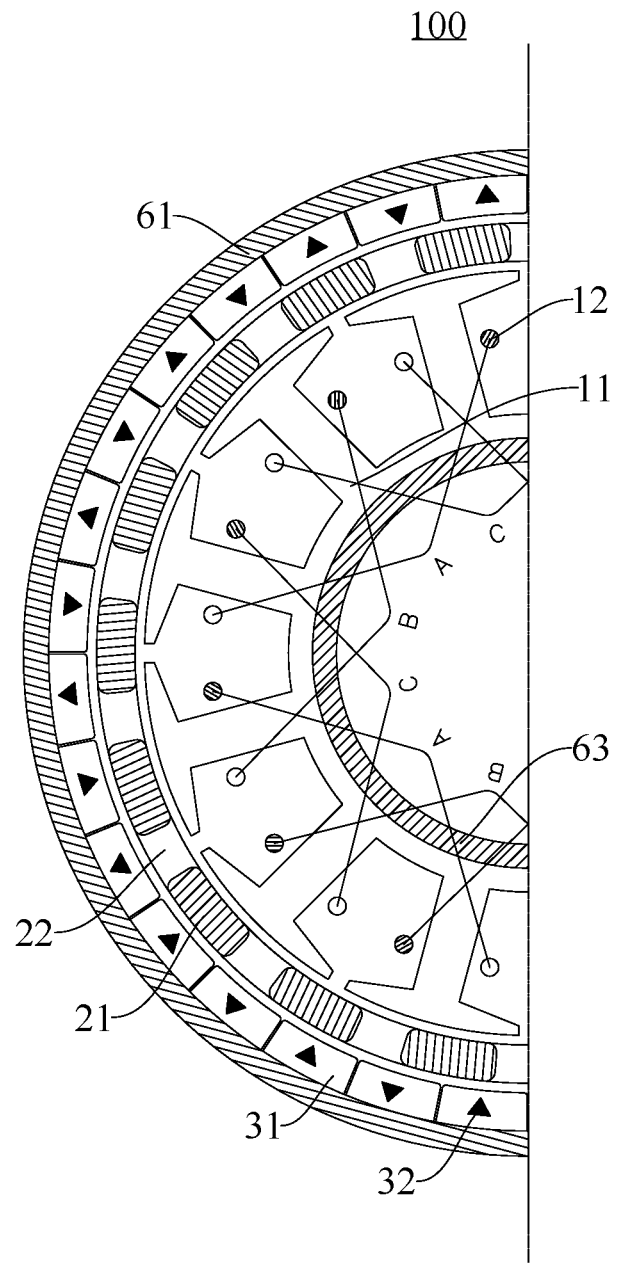
FIG. 15 is a half sectional view of an electric motor according to another embodiment of the present disclosure.

As illustrated in FIGS. 15 to 17, in the present embodiment, the excitation stator 10 is disposed at the innermost layer of the three-layer main structure of the overall electric motor 100, and is the fixed component without rotation. The excitation stator 10 contains the stator permeable core 11, the stator winding 12, and the fixed support shaft 42. The number of slots of the stator permeable core Ns=12, the stator winding 12 is the three-phase distributed winding, and the span of the coil is 3. The stator winding 12 generates the rotating magnetic field of the excitation stator 10 with the pole-pair number ps=2 when the stator winding 12 is applied with symmetrical three-phase current. The excitation stator 10 is directly connected to the fixed support shaft 42, and the fixed support shaft 42 is configure as a fixing and supporting component of the electric motor 100.

The salient-pole rotor 20 contains the permeable core 21, the non-permeable spacer block 22, the inner rotor housing 62, and the number of the permeable cores 21 pr=18. The excitation rotor 30 contains the rotor permeable core 31, the permanent magnet 32, and the outer rotor housing 61. The permanent magnet 32 is mounted at radially inner side of the rotor permeable core 31 with the same polarities spaced apart, such that the excitation rotor 30 generates the excitation magnetic field with the pole-pair number pf=16. The rotor permeable core 31 is directly connected to the load to serve as the drive output component. The excitation stator 10, the excitation rotor 30, the salient-pole rotor 20 and the fixed support shaft 42 for supporting the electric motor 100 maintain the distance and the rotational independence between each other by the bearing 70 therebetween.

The switching actuator 50 contains the control coil, the sliding ring 542, the excitation stator fixing ring 51, the salient-pole rotor fixing ring 52 and the excitation rotor fixing ring 53. The sliding ring 542 is a gear ring having latches both on radially inner side and outer side, the excitation rotor fixing ring 51 is a gear ring having latches on the radially outer side, and the salient-pole rotor fixing ring 52 and the excitation rotor fixing ring 53 are gear rings having latches on the radially inner side.

As illustrated in FIG. 16, in the third operational state of the electric motor 100, the sliding ring 542 translates to the right under the drive generated by the control coil, and engages the excitation stator fixing ring 51 and the salient-pole rotor fixing ring 52 together, such that the excitation stator 10 and the salient-pole rotor 20 are integrally connected to serve as the stator of the electric motor 100, and the excitation rotor 30 serves as the rotation component of electric motor 100. In this state, the equivalent operational rotor pole-pair number of the electric motor 100 is pf=16, and the electric frequency of the electric motor 100 at the rotation speed of 600 rpm is 160 Hz.

As illustrated in FIG. 17, in the second operational state of the electric motor 100, the sliding ring 542 translates to the left under the drive generated by the control coil, and engages the excitation rotor fixing ring 53 and the salient-pole rotor fixing ring 52 together, such that the excitation rotor 30 and the salient-pole rotor 20 are integrally connected to serve as the rotor of the electric motor 100, and the excitation stator serves as the stator of electric motor 100. In this state, the equivalent operational rotor pole-pair number of the electric motor 100 is ps=2, and the electric frequency of the electric motor 100 at the rotation speed of 600 rpm is 20 Hz.

The present embodiment does not contain the first operational state of the embodiment 1 of the present disclosure.

The ratio of the equivalent pole-pair numbers to the operational frequencies of the present embodiment in the third and second operational states is 8:1.

Thus, when the electric motor 100 operates in the low-speed high-torque region, an operational state with a great number of equivalent pole pairs is employed, and the output torque is large; when the electric motor 100 operates in the high-speed operational region, an operational state with a small number of equivalent pole pairs is employed, requirements for the high speed operation are naturally met without the field weakening control, and the efficiency is greatly improved due to the reduced operational frequency. The equivalent rotor pole-pair numbers and the operational electric frequencies of the electric motor 100 in the two operational states are significantly different, the variable-pole variable-pressure operation is realized without changing the winding connection of the electric motor 100, and the operational rotation speed range of the electric motor 100 is broadened, thereby effectively improving the torque density and the high power density of the electric motor 100, and expanding the application range of the electric motor 100. The electric motor 100 has the compact structure, the little space occupation, and the wide application range, and can realize the controlled adjustment to the rotor pole number and the operational frequency without changing the winding connection of the electric motor 100, and can output more torque and power compared to the electric motor 100 in the related art having the same overall volume, thus having advantages of high torque and high power density.

Other constitutions and operations of the electric motor 100 according to embodiments of the present disclosure are well known by those skilled in the art, which will not be described in detail herein.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise," should be construed to refer to the orientation as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance. Thus, features limited by "first" and "second" are intended to indicate or imply including one or more than one these features. In the description of the present disclosure, the term "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements. The above terms can be understood by those skilled in the art according to specific situations.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, various embodiments or examples described in the present specification may be combined by those skilled in the art.

Although explanatory embodiments of the present disclosure have been shown and described, it would be appreciated by those skilled in the art that the above embodiments are exemplary and cannot be construed to limit the present disclosure, and changes, alternatives, modifications and variations can be made in the above embodiments within the scope of the present disclosure.

What is claimed is:

1. An electric motor comprising:
   an excitation stator, a salient-pole rotor and an excitation rotor, any two of the excitation stator, the salient-pole rotor and the excitation rotor being rotatable relative to each other;
   a switching actuator configured to select one of the salient-pole rotor and the excitation rotor to serve as a rotor relatively rotating to the excitation stator by selectively fixing relative positions of two of the excitation stator, the salient-pole rotor and the excitation rotor;
   an electric motor shaft adapted to be drivingly connected to a load, the electric motor shaft being driven to rotate by the rotor relatively rotating to the excitation stator;
   a stator housing, wherein the excitation stator, the salient-pole rotor and the excitation rotor are all disposed in the stator housing, wherein the excitation stator is drivingly connected to the stator housing; and
   an end cap, wherein the salient-pole rotor and the electric motor shaft are drivingly connected to the end cap separately,
   wherein the switching actuator comprises:
      an excitation stator fixing ring drivingly connected to the stator housing,
      a salient-pole rotor fixing ring drivingly connected to the electric motor shaft, and
      an excitation rotor fixing ring is drivingly connected to the excitation rotor.

2. The electric motor according to claim 1, wherein the excitation stator, the salient-pole rotor and the excitation rotor are spaced apart from the outside to the inside in a radial direction of the electric motor.

3. The electric motor according to claim 1, wherein the excitation stator, the salient-pole rotor and the excitation rotor are spaced apart from the inside to the outside in a radial direction of the electric motor.

4. The electric motor according to claim 1, wherein:
   the switching actuator is switchable between a first state and a second state, and one of the salient-pole rotor and the excitation rotor is adapted to be drivingly connected to the load,
   the switching actuator fixes relative positions of the excitation stator and the other one of the salient-pole rotor and the excitation rotor when in the first state, and
   the switching actuator fixes the salient-pole rotor and the excitation rotor when in the second state.

5. The electric motor according to claim 1, wherein the excitation stator comprises:
   a stator permeable core; and
   a stator winding wound around the stator permeable core.

6. The electric motor according to claim 1, wherein the excitation rotor comprises:
   a rotor permeable core; and
   a permanent magnet disposed to the rotor permeable core.

7. The electric motor according to claim 1, wherein the salient-pole rotor comprises:
   a plurality of permeable cores; and
   a plurality of non-permeable spacer blocks, the plurality of permeable cores and the plurality of non-permeable spacer blocks being arranged alternately in a circumferential direction of the electric motor.

8. The electric motor according to claim 7, wherein the excitation stator is driven by an alternate current, the number of pole pairs of a rotating magnetic field generated by the excitation stator is denoted by $p_s$, the number of pole pairs of an excitation magnetic field generated by the excitation rotor is denoted by $p_f$, and the number of the permeable cores is denoted by $p_r$, wherein $p_r = |p_s \pm p_f|$.

9. The electric motor according to claim 1, wherein the switching actuator is disposed in the excitation rotor.

10. The electric motor according to claim 1, wherein the stator housing and the electric motor shaft are fitted by a bearing, the end cap and the excitation rotor are fitted by a bearing, and the excitation rotor and the stator housing are fitted by a bearing.

11. The electric motor according to claim 1, wherein the switching actuator is disposed outside the excitation rotor and adjacent to an end of the excitation rotor.

12. The electric motor according to claim 1, wherein the switching actuator is disposed outside the excitation stator and adjacent to an end of the excitation stator.

13. The electric motor according to claim 1, further comprising:
   an outer rotor housing, the excitation stator, the salient-pole rotor and the excitation rotor being all disposed in the stator housing, and the excitation rotor being drivingly connected to the outer rotor housing; and
   an inner rotor housing, the excitation stator being drivingly connected with a fixed support shaft, and the salient-pole rotor and the fixed support shaft being drivingly connected to the inner rotor housing separately,
   wherein the excitation stator fixing ring is drivingly connected to the fixed support shaft, the salient-pole rotor fixing ring is drivingly connected to the inner rotor housing, and the excitation rotor fixing ring is drivingly connected to the outer rotor housing, and
   wherein the fixed support shaft is a hollow shaft with an annular cross section.

14. A switching actuator for an electric motor comprising an excitation stator, a salient-pole rotor and an excitation rotor, the switching actuator comprising:
   an excitation stator fixing ring, relative positions of the excitation stator fixing ring and the excitation stator being fixed;
   a salient-pole rotor fixing ring, relative positions of the salient-pole rotor fixing ring and the salient-pole rotor being fixed;
   an excitation rotor fixing ring, relative positions of the excitation rotor fixing ring and the excitation rotor being fixed, one of the salient-pole rotor fixing ring and the excitation rotor fixing ring being adapted to be drivingly connected to a load;
   a driving part; and
   a sliding ring capable of being driven to slide by the driving part,
   when the switching actuator is in a first state, the sliding ring is fitted with the excitation stator fixing ring and the other one of the salient-pole rotor fixing ring and the excitation rotor fixing ring separately under the drive of the driving part, and
   when the switching actuator is in a second state, the sliding ring is fitted with the salient-pole rotor fixing ring and the excitation rotor fixing ring separately under the drive of the driving part,
   wherein the sliding ring, the excitation stator fixing ring, the salient-pole rotor fixing ring and the excitation rotor fixing ring are each provided with a latch,
   wherein when the switching actuator is in the first state, the latch of the sliding ring is engaged with the latch of the excitation stator fixing ring and the latch of the other one of the salient-pole rotor fixing ring and the excitation rotor fixing ring separately, and
   wherein when the switching actuator is in the second state, the latch of the sliding ring is engaged with the latch of the salient-pole rotor fixing ring and the latch of the excitation rotor fixing ring separately.

15. The switching actuator according to claim 14, wherein the driving part is a control coil configured to drive the sliding ring to slide by electromagnetic induction.

16. An electric motor comprising:
   an excitation stator comprising: a stator permeable core and a stator winding wound around the stator permeable core;
   an excitation rotor comprising: a rotor permeable core and a permanent magnet disposed to the rotor permeable core;
   a salient-pole rotor comprising: a plurality of permeable cores and a plurality of non-permeable spacer blocks, the plurality of permeable cores and the plurality of non-permeable spacer blocks being arranged alternately in a circumferential direction of the electric motor; and
   a switching actuator configured to select one of the salient-pole rotor and the excitation rotor to serve as a rotor rotatable relative to the excitation stator by selectively fixing relative positions of two of the excitation stator, the salient-pole rotor and the excitation rotor,
   wherein the excitation stator is driven by an alternate current, the number of pole pairs of a rotating magnetic field generated by the excitation stator is denoted by $p_s$, the number of pole pairs of an excitation magnetic field generated by the excitation rotor is denoted by $p_i$, and the number of the permeable cores is denoted by $p_r$, wherein $p_r = |p_s \pm p_f|$.

* * * * *